US012425338B2

(12) United States Patent
Liu et al.

(10) Patent No.: US 12,425,338 B2
(45) Date of Patent: Sep. 23, 2025

(54) PRIORITIZING DATA FLOWS

(71) Applicant: QUALCOMM Incorporated, San Diego, CA (US)

(72) Inventors: Feilu Liu, San Diego, CA (US); Suli Zhao, San Diego, CA (US); Siddharth Gupta, San Diego, CA (US); Alok Mitra, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 22 days.

(21) Appl. No.: 18/414,520

(22) Filed: Jan. 17, 2024

(65) Prior Publication Data
US 2025/0233826 A1 Jul. 17, 2025

(51) Int. Cl.
*H04L 45/00* (2022.01)
*H04L 45/42* (2022.01)
*H04W 28/02* (2009.01)

(52) U.S. Cl.
CPC ............ *H04L 45/566* (2013.01); *H04L 45/42* (2013.01); *H04W 28/0278* (2013.01)

(58) Field of Classification Search
CPC ... H04L 45/566; H04L 45/42; H04L 47/2433; H04L 47/10; H04L 47/2441; H04L 47/24; H04L 47/805; H04W 28/0278
USPC .......................................................... 709/238
See application file for complete search history.

(56) References Cited

U.S. PATENT DOCUMENTS

| 8,233,488 | B2 * | 7/2012 | Livescu ................. H04L 47/10 370/395.31 |
| 2007/0104102 | A1 * | 5/2007 | Opsasnick .......... H04L 47/2433 370/412 |
| 2008/0056295 | A1 * | 3/2008 | Loda ................... H04L 47/2441 370/437 |
| 2011/0276699 | A1 * | 11/2011 | Pedersen ................ H04L 45/24 709/227 |
| 2012/0269059 | A1 * | 10/2012 | Gupta ................... H04W 8/082 370/229 |
| 2016/0234124 | A1 * | 8/2016 | Tomici ................ H04L 47/2491 |
| 2017/0155590 | A1 * | 6/2017 | Dillon ................. H04L 12/2867 |

(Continued)

FOREIGN PATENT DOCUMENTS

| CN | 110249596 A * | 9/2019 | ......... H04L 47/2433 |
| WO | WO-2012054652 A1 * | 4/2012 | ............ H04W 8/082 |

(Continued)

*Primary Examiner* — Ruolei Zong
(74) *Attorney, Agent, or Firm* — Muncy, Geissler, Olds & Lowe, P.C.

(57) ABSTRACT

Various embodiments include methods of managing mixed data flow types in communications in a network apparatus. The network apparatus may determine data flow priority levels of a plurality of data flows, identify high-priority data flows associated with a particular LAN interface, and assign a designated public IP address range or a designated public port range for the high-priority data. Upon receiving an uplink, the apparatus may select a source port number from the previously reserved range dedicated for high-priority data flows in response to the received packet matching one or more prioritized data flow packet filters, modify the received uplink packet, and forward the modified uplink packet to the next hop in the path towards the destination IP address in response to determining that the packet is enqueued successfully.

20 Claims, 12 Drawing Sheets

(56) References Cited

U.S. PATENT DOCUMENTS

2018/0198838 A1* 7/2018 Murgia ............... H04L 47/2491
2018/0198890 A1* 7/2018 Dhanabalan ............ H04L 67/56

FOREIGN PATENT DOCUMENTS

WO    WO-2015042389 A1 * 3/2015 ............. H04L 47/14
WO    WO-2019182889 A1 * 9/2019 ........... H04B 7/0413

* cited by examiner

PRIORITIZING DATA FLOWS

BACKGROUND

Consumer electronics have undergone dramatic development and expansion to the point that it is common for homes to include dozens of computing devices, such as laptop computers, tablet computers, smartphones, gaming systems, etc. and smart appliances, such as smart televisions, home automation systems, voice-activated interfaces to cloud-based artificial intelligence (AI) services, home sensor and security systems, etc., all connected to wired and wireless network access devices (e.g., Wi-Fi routers). Such customer premise equipment (CPE) can place significant demands on internal and external network communications.

At the same time, the automotive industry is evolving towards increasingly advanced self-driving technologies that enable vehicles to operate with minimal or no human intervention. Modern cars and trucks are equipped with a variety of sensors, including but not limited to cameras, radar, LIDAR, GPS, odometers, and accelerometers, which collect data about vehicle surroundings and operating state. Such vehicles also incorporate control systems that analyze this sensor data to identify potential hazards and establish appropriate navigation paths. The future promises further expansion and leveraging of such technologies as manufacturers develop and deploy self-driving capabilities and fully autonomous driving systems.

Concurrent with these trends, advances in cellular and wireless communication technologies have emerged. Technologies such as 5G New Radio (5G NR) are offering an expanding range of features and services. These advancements have catalyzed the growth of CPE devices and services as well as intelligent transportation systems (ITS) that utilize vehicle-based communications to enhance the safety and efficiency of transportation resources and motor vehicles.

An important aspect of this evolving landscape is the increasing reliance on real-time data transmission for time-critical processes, such as advanced vehicle features. Data Radio Bearers (DRBs) serve as important conduits for the transfer of user data between the CPEs and vehicles and cellular networks, including Long-Term Evolution (LTE) and 5G New Radio (NR). These DRBs may be governed by specific Quality of Service (QOS) parameters, such as latency, packet error rate, and bit rate, to classify and prioritize different types of data flows effectively.

SUMMARY

Various aspects include methods of managing mixed data flow types in communications in a network apparatus supporting customer premise equipment (CPE) deployments and evolving automotive systems. Various aspects may include determining data flow priority levels of a plurality of data flows, identifying high-priority data flows in the plurality of data flows associated with a local area network (LAN) interface, and assigning a designated public internet protocol (IP) address range or a designated public port range for the identified high-priority data flows associated with the LAN interface.

Some aspects may further include receiving an incoming uplink packet, parsing the received uplink packet to determine one or more uplink packet parameters, the one or more uplink packet parameters which may include at least one or more of an uplink packet source IP address, an uplink packet destination IP address, an uplink packet protocol number, an uplink packet source port number, an uplink packet destination port number, an uplink packet Ethernet source media access control (MAC) address, an uplink packet Ethernet destination MAC address, or other parameters in a packet header, determining whether the received uplink packet matches one or more prioritized data flow packet filters, and selecting a high-priority source port number from the designated public port range for the identified high-priority data flows associated with the LAN interface in response to determining that the received packet matches one or more of the prioritized data flow packet filters.

Some aspects may further include generating a modified uplink packet that replaces a private source IP address of the received uplink packet with a public IP address of the network apparatus and replaces a private source port number of the received uplink packet with the selected high-priority source port number, commencing enqueuing the modified uplink packet into an uplink high-priority transmission queue, and forwarding the modified uplink packet to a next hop in a path towards the uplink packet destination IP address in response to determining that the modified uplink packet may be enqueued successfully.

In some aspects, commencing enqueuing the modified uplink packet into the uplink high-priority transmission queue may include determining a priority level of the received uplink packet, determining a projected data radio bearer (DRB) buffer occupancy value that indicates a size of an uplink DRB buffer occupied by packets after adding the received uplink packet, determining whether the projected DRB buffer occupancy value exceeds a threshold value associated with the priority level of the received uplink packet, discarding the received uplink packet in response to determining that the projected DRB buffer occupancy value exceeds the threshold value associated with the priority level of the received uplink packet, and enqueuing the received uplink packet in response to determining that the projected DRB buffer occupancy value does not exceed the threshold value associated with the priority level of the received uplink packet.

Some aspects may further include receiving an incoming downlink packet that corresponds to the received uplink packet, parsing the received downlink packet to determine a downlink packet source IP address, a downlink packet destination IP address, a downlink packet source port number, or a downlink packet destination port number, and determining whether the downlink packet destination port number or destination IP address falls within the designated public port range or IP address range, respectively, for the identified high-priority data flows associated with the LAN interface by matching the received downlink packet against a packet filter which may include a component "destination port range" set to the designated public port range for the identified high-priority data flows associated with the LAN interface, or matching the received downlink packet against a packet filter which may include a component "destination IP address range" set to the designated IP address range for the identified high-priority data flows associated with the LAN interface.

Some aspects may further include determining an updated downlink packet destination IP address or an updated downlink packet destination port number for the received downlink packet based on a corresponding network address translation (NAT) mapping stored in the memory, generating a modified downlink packet that include the updated downlink packet destination IP address or the updated downlink packet destination port number, commencing enqueuing the received downlink packet into a downlink high-priority transmission queue of a projected downlink interface of a next hop toward the downlink packet destination IP address, and forwarding the modified downlink packet to the next hop in a path towards the updated downlink packet destination IP address in response to determining that the received downlink packet may be enqueued successfully.

In some aspects, the projected downlink next-hop interface may be a WiFi interface, an Ethernet network interface controller (NIC) interface, a Bluetooth interface, or a universal serial bus (USB) interface.

In some aspects, commencing enqueuing the received downlink packet into the downlink high-priority transmission queue may include determining a priority level of the received downlink packet, determining a projected downlink next-hop interface buffer occupancy value that indicates a size of a downlink next-hop interface buffer occupied by packets after adding the received downlink packet, and determining whether the projected downlink next-hop interface buffer occupancy value exceeds a threshold value associated with the priority level of the received downlink packet.

In some aspects, commencing enqueuing the received downlink packet into the downlink high-priority transmission queue may include discarding the received downlink packet in response to determining that the projected downlink next-hop interface buffer occupancy value exceeds the threshold value associated with the priority level of the received downlink packet, and enqueuing the received downlink packet in response to determining that the projected downlink next-hop interface buffer occupancy value does not exceed the threshold value associated with the priority level of the received downlink packet.

Further aspects may include a computing device having at least one processor or processing system configured with processor-executable instructions to perform various operations corresponding to the methods summarized above. Further aspects may include a computing device having various means for performing functions corresponding to the method operations summarized above. Further aspects may include a non-transitory processor-readable storage medium having stored thereon processor-executable instructions configured to cause at least one processor or processing system to perform various operations corresponding to the method operations summarized above.

BRIEF DESCRIPTION OF THE DRAWINGS

The accompanying drawings, which are incorporated herein and constitute part of this specification, illustrate exemplary embodiments of the claims, and together with the general description given and the detailed description, serve to explain the features herein.

DETAILED DESCRIPTION

Figure 1A:
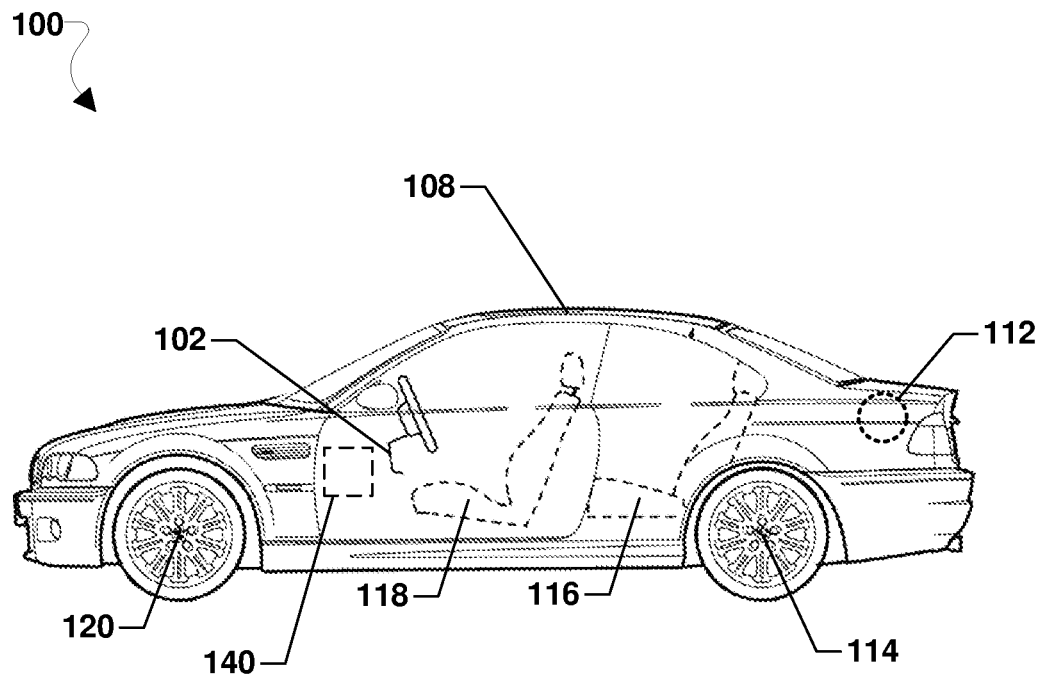
FIGS. 1A and 1B are component block diagrams illustrating a vehicle suitable for implementing various embodiments.

Various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the claims.

In overview, various embodiments provide solutions for managing mixed data flow types in communications in a network apparatus supporting CPE deployments and evolving automotive systems by prioritizing data flows in both uplink (UL) and downlink (DL) directions. In some embodiments, dedicated network address translation (NAT) port ranges or designated IP address ranges may be dedicated to certain data flows, devices, and local area network (LAN) interfaces that share a common priority level. Dedicated buffers within each data radio bearer (DRB) may be reserved for high-priority data. Priority levels may be defined and associated with specific NAT port ranges or designated IP address ranges. Establishing predefined priority levels may reduce the complexity of the packet filtering operations and/or allow for more efficient queue management operations. Specific NAT port ranges or designated IP address ranges may be associated with particular QoS requirements to streamline QoS enforcement processes.

Some embodiments may include methods (and components configured to implement the methods) for managing mixed data flow types. In some embodiments, the components (e.g., network apparatus, etc.) may be configured to determine data flow priority levels of a plurality of data flows, identify high-priority data flows in the plurality of data flows associated with a particular LAN interface, and assign a designated IP address range or a designated public port range (e.g., 60000-61000) for the high-priority data flows associated with a particular LAN interface. The components may receive an incoming uplink packet and parse the received uplink packet to determine a source internet protocol (IP) address, a destination IP address, a protocol number, a source port number, a destination port number, an Ethernet source media access control (MAC) address, an Ethernet destination MAC address, or other parameters in the packet headers. The components may determine whether the received packet matches one or more prioritized data flow packet filters, select a source port number from the previously reserved range dedicated for high-priority data flows (e.g., select 60001 from the range 60000-61000) in response to determining that the received packet matches one or more prioritized data flow packet filters, modify the received uplink packet by replacing the private source IP address with a public IP address of the network apparatus and replacing the private source port number with the selected high-priority source port number, commence enqueuing the uplink packet into an uplink high-priority transmission queue, and forward the modified uplink packet to the next hop in the path towards the destination IP address if the packet is enqueued successfully.

Various embodiments may improve the performance, functioning, efficiency, security, and/or reliability of the network and its constituent components. For example, the embodiments may reduce latency and/or improve the bandwidth utilization efficiency of select applications by prioritizing the data flows, which may be accomplished by assigning specific IP or port ranges to high-priority traffic to aid in the rapid identification and processing of important data packets. In addition, parsing the incoming packets may allow for more informed routing decisions and help provide timely delivery of the data, modifying the packets for public network communication may allow for accurate routing across different network segments, the priority-based queue management operations may reduce or eliminate processing delays for high-priority traffic, etc.

As used herein, the term "network apparatus" refers to any of a variety of communication devices that support data flows between and among various computing devices and with external networks. Nonlimiting examples of network apparatuses include wireless access points, Wi-Fi routers, wired and wireless routers, automotive network routers, vehicle communication systems for linking vehicle systems to external networks (e.g., ITS communication networks, cellular wireless networks, etc.), and the like. As described, a network apparatus may include a processing system including at least one processor, memory, and communication components (e.g., wired and/or wireless transceivers) configured to support uplink and downlink communications between edge computing devices (e.g., CPE and vehicle systems and subsystems) and external networks.

As used herein, the terms "component," "system," "unit," "module," and the like include a computer-related entity, such as, but not limited to, hardware, firmware, a combination of hardware and software, software, neural network models, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions, neural network models, and/or data structures stored thereon. Components may communicate by way of local and/or remote processes, function or procedure calls, electronic signals, data packets, memory read/writes, and other known computer, processor, and/or process related communication methodologies.

The term "computing device" is used herein to refer to (but not limited to) any one or all of personal computing devices, personal computers, workstations, laptop computers, Netbooks, Ultrabook, tablet computers, mobile computing devices, smartphones, user equipment (UE), personal data assistants (PDAs), palm-top computers, wireless electronic mail receivers, multimedia internet-enabled cellular telephones, media and entertainment systems, gaming systems (e.g., PlayStation™, Xbox™, Nintendo Switch™), media players (e.g., DVD players, Roku™, apple TV™), digital video recorders (DVRs), portable projectors, 3D holographic displays, wearable devices (e.g., earbuds, smartwatches, fitness trackers, augmented reality (AR) glasses, head-mounted displays, etc.), vehicle systems such as drones, automobiles, motorcycles, connected vehicles, electric vehicles, automotive displays, advanced driver-assistance systems (ADAS), etc., cameras (e.g., surveillance cameras, embedded cameras), smart devices (e.g., smart light bulbs, smartwatches, thermostats, smart glasses, etc.), Internet of Things (IoT) devices, other similar devices that include a programmable processor or processing system that may be configured to provide the functionality of various embodiments.

The term "processing system" is used herein to refer to one more processors, including multi-core processors, that are organized and configured to perform various computing functions. Various embodiment methods may be implemented in one or more of multiple processors within a processing system as described herein.

The term "system on chip" (SoC) is used herein to refer to a single integrated circuit (IC) chip that contains multiple resources or independent processors integrated on a single substrate. A single SoC may contain circuitry for digital, analog, mixed-signal, and radio-frequency functions. A single SoC may include processing system of a processing system that includes any number of general-purpose or specialized processors (e.g., network processors, digital signal processors, modem processors, video processors, etc.), memory blocks (e.g., ROM, RAM, Flash, etc.), and resources (e.g., timers, voltage regulators, oscillators, etc.). For example, an SoC may include an applications processor that operates as the SoC's main processor, central processing unit (CPU), microprocessor unit (MPU), arithmetic logic unit (ALU), etc. An SoC processing system also may include software for controlling integrated resources and processors, as well as for controlling peripheral devices.

The term "system in a package" (SIP) is used herein to refer to a single module or package that contains multiple resources, computational units, cores, or processors on two or more IC chips, substrates, or SoCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SOCs coupled together via high-speed communication circuitry and packaged in close proximity, such as on a single motherboard, in a single UE, or in a single CPU device. The proximity of the SoCs facilitates high-speed communications and the sharing of memory and resources.

The term "data radio bearer" (DRB) is used herein to refer to a communication channel suitable for carrying user data between a user equipment (UE) device and a base station, such as an evolved NodeB (eNB) or gNodeB (gNB) in a Long-Term Evolution (LTE) or 5G New Radio (NR) networks. The DRB may serve to operate as a pipeline through which data packets are transmitted from the source to the destination in either uplink (UL) or downlink (DL) directions and/or a conduit that helps manage and route data within the network. The DRB may be established based on various parameters (e.g., Quality of Service (QOS) parameters, etc.), which may include metrics (e.g., latency, packet error rate, bit rate, etc.) and/or which may be used to prioritize different types of data flows.

The term "network address translation" (NAT) is used herein to refer to a networking procedure in which one or more local network IP addresses are mapped to one or more public IP addresses, thereby enabling internal network structures to be securely and effectively connected to external networks such as the internet. The NAT technique is commonly implemented in various types of computing and networking hardware, including but not limited to user equipment (UE) devices and customer premises equipment (CPE), which may include routers, gateways, firewalls, etc. The NAT operations may facilitate the routing of data packets in both uplink (UL) and downlink (DL) directions, serving as a mechanism for IP masquerading that enhances network security. NAT supports the assignment of specific port ranges or designated IP address ranges to specific types of traffic. As such, some embodiments may use NAT to prioritize specific data flows.

The term "packet filter" is used herein to refer to a specialized component, logic, set of rules, or criteria used within network environments to control the passage of data packets between devices or network segments. Packet filters may operate at the link layer (layer-2), network layer (layer-3) or transport layer (layer-4), examining attributes such as source MAC address, sour destination MAC address, source IP address, destination IP address, protocol, source port number, and destination port number to determine whether a given data packet should be allowed or denied transit. Additionally, packet filters may consider various protocols, including but not limited to TCP, UDP, and ICMP, as part of their decision-making process. Packet filters may be integrated into network hardware and software elements, such as routers, firewalls, and User Equipment (UE) devices, to enforce network security policies, enhance performance, or prioritize data flows. Packet filters may be static, with rules pre-configured by an administrator, or dynamic, adapting to real-time network conditions. The functionality of packet filters may be extended and fine-tuned through the use of specialized components, such as "port range components" and "IP address range components," which may contribute to more nuanced and efficient data packet routing.

The terms "port range component" and "IP address range component" are used herein to refer to specific types of packet filter elements that are defined in and/or are consistent with 3GPP standards. These components may facilitate refined control over data packet routing in network environments. The "port range component" may allow for identifying of a range of port numbers that a data packet should match for the filter to apply. Similarly, the "IP address range component" may offer the ability to specify a range of IP addresses, made possible through the use of IP masks in IPv4 or prefix lengths in IPV6, that a data packet must match to pass through the filter. These components may be used in conjunction with NAT procedures to support more granular data flow management. Given their utility in packet filtering and routing, these components find application in various types of computing and networking hardware, including User Equipment (UE) devices and Customer Premises Equipment (CPE).

As examples, the component types "IPv4 Remote Address Type," "IPv4 Local Address Type," "IPv6 Remote Address/Prefix Length Type," "IPv6 Local Address/Prefix Length Type," "Local Port Range Type," and "Remote Port Range Type" are detailed in the 3GPP Technical Specification (TS) 24.501 Rel-17 Table 9.11.4.13.1. These specific components contribute to the flexible configuration of packet filters for efficacious routing of data packets in network systems. For example, the "IPv4 Remote Address Type" and "IPv4 Local Address Type" may help determine the IPv4 addresses, both remote and local, that a packet should match for successful navigation through a filter. Similarly, "IPv6 Remote Address/Prefix Length Type" and "IPv6 Local Address/Prefix Length Type" may provide a framework for identifying IPv6 addresses, augmented by prefix lengths, which a data packet should adhere to for proper routing. The "Local Port Range Type" and "Remote Port Range Type" may define the scope of port numbers, whether on the local or remote side, that need to be matched by a data packet for the filter to be applicable. As foundational elements, these components may be used for shaping packet filter configurations, allowing for the identification of specific IP addresses and port number ranges that guide the operation of a packet filter.

The term "IP address range" may be used herein to refer to a sequence of IP addresses that are grouped together for various purposes, such as allocation, routing, or filtering. The IP address range may be specified through a subnetting technique using an IPv4 address mask or an IPV6 prefix length. As an example, a packet filter with a component "source IP address 192.168.1.1 with a mask 255.255.255.0" may match 256 source IP addresses from 192.168.1.0 to 192.168.1.255. For IPV4, the subnet mask may be used to indicate the portion of the IP address that represents the network and the portion that represents the host within that network. A network device may use the mask for packet filtering and/or to identify all packets that have a source IP address within the specified range. If a packet's source IP address falls within the starting and ending addresses of the range, the network device may determine that the IP address matches the filter criteria. This allows network devices to apply rules or actions to a group of IP addresses rather than to individual addresses. The IPV6 operations may be similar to those above but the network device may use a prefix length to determine the address range. For example, a /64 prefix length may indicate that the first 64 bits of the IPV6 address are used for network identification and that the remaining bits may be used for host addresses.

There are a number of technical challenges for a network apparatus associated with managing mixed data flow types (e.g., multiple data flows with differing QoS requirements, etc.) in modern wireless automotive and CPE network deployments. These challenges may be especially pronounced when a network apparatus uses a cellular backhaul. One issue is the co-existence of multiple data flows that have differing Quality of Service (QOS) requirements. Latency-tolerant data flows (e.g., file synchronization to cloud services, etc.) do not have stringent latency requirements whereas real-time data flows (e.g., Voice over Internet Protocol (VOIP), MS Teams conferencing, etc.) may be sensitive to delays and require low latency. Using conventional solutions, these disparate types of data flows (e.g., latency-tolerant data flows, real-time data flows, etc.) may share the same DRB and a network apparatus's corresponding uplink buffer (UL buffer) that temporarily stores data before it is transmitted upstream.

In conventional solutions, there are considerable technical challenges in configuring a network apparatus associated with overlapping multiple data flows with differing QoS requirements in a single DRB and its corresponding UL buffer, particularly in CPE and automotive network deployments that employ a cellular backhaul. For example, a series of complications and technical challenges may arise when latency-sensitive real-time services, such as VoIP or video conferencing, share the same resources as latency-tolerant flows such as file synchronization. Packets from real-time flows may experience delays when queued behind latency-tolerant data in the UL buffer, which may negatively impact the performance and functioning of the device and degrade the user experience. In addition, the allocation of bandwidth and buffer space to accommodate multiple different types of flows may become exceedingly complicated, potentially resulting in either compromised real-time service or inefficient utilization of resources. When different data flow types share the same DRB and UL buffer, enforcement of distinct QoS policies for each type of flow by a network apparatus may also become complex, making it challenging to meet the specific QOS requirements of each flow. Further, if large volumes of latency-tolerant data await transmission, the UL buffer in a network apparatus may become congested and exacerbate the latency issues for real-time data flows.

Another technical challenge involves the efficient prioritization by a network apparatus of a substantial number of active data flows in both uplink (UL) and downlink (DL) directions, which is often amplified by several factors. For example, a user may wish to prioritize data flows emanating from several devices, with each device possibly having multiple active data flows. As another example, each network apparatus could be connected to a considerable number of LAN clients (e.g., up to 128, etc.), each with at least one data flow that may need prioritization.

Using conventional solutions, each data flow may require a dedicated packet filter, which may in turn create additional technical challenges. For example, the packet filtering process is sequential by design. As such, when a packet arrives at the network apparatus, the hardware sequentially compares the packet against each available packet filter until a match is found or all filters have been compared. This sequential comparison may introduce delays, thereby increasing the latency in data transmission and potentially affecting the user experience. In addition, because packet filtering often occurs at the hardware level of a network apparatus, an increase in the number of packet filters may require additional hardware resources for storing these filters. This may increase the overall network apparatus hardware costs.

Various embodiments include methods and network apparatuses (which may be in CPE or automobile networks) implementing the methods to overcome these and other technical challenges and limitations of conventional solutions. Various embodiments may include network apparatuses configured to implement an advanced solution for managing mixed data flow types in wireless automotive and CPE deployments and prioritizing data flows in both Uplink (UL) and Downlink (DL) directions. In some embodiments, the network apparatuses may be configured to assign or allocate dedicated network address translation (NAT) port ranges or designated IP address ranges to data flows, devices, and LAN interfaces that share the same priority level. In some embodiments, the network apparatuses may be configured to reserve a dedicated buffer within each DRB for high-priority data.

In some embodiments, a network apparatus may include a processor configured to define priority levels and associate the defined priority levels with specific NAT port ranges or designated IP address ranges. In particular, the network apparatus processor may be configured to determine data flow priority levels of a plurality of data flows, and identify high-priority data flows in the plurality of data flows associated with a particular LAN interface. By establishing predefined priority levels, the network apparatus may reduce the complexity of the packet filtering operations and/or allow for more efficient queue management operations. Specific NAT port ranges or designated IP address ranges may be associated with different QoS requirements, effectively streamlining the process for QoS enforcement.

In some embodiments, the network apparatus may be configured to allocate a dedicated port range or a dedicated IP address range for each Local Area Network (LAN) interface (which may include both tethered and embedded interfaces) and map these dedicated port or IP address ranges to pre-configured data flows with high priority on the Wide Area Network (WAN) and/or to all data flows originating from pre-configured high-priority devices on the LAN. In some embodiments, the network apparatus processor may be configured to assign a designated IP address range or a designated public port range for the high-priority data flows associated with a particular LAN interface. Such embodiments may enable the edge or end point device to use a single packet filter with a component designated as "port range" to identify all high-priority flows corresponding to a specific interface post-NAT. Such embodiments may also enable the edge or end point device to use a single packet filter with a component designated as "IP address range" to identify all high-priority flows corresponding to a specific interface prior-NAT if the designated IP address range is private IP address range, or post-NAT if the designated IP address range is public IP address range.

In some embodiments, the network apparatuses may be configured to perform different filtering operations based on the direction of data flow. In some embodiments, the network apparatus processor may be configured to receive an incoming uplink packet, parse the received uplink packet to determine a source internet protocol (IP) address, a destination IP address, a protocol number, a source port number, a destination port number, an Ethernet source MAC address, an Ethernet destination MAC address, or other parameters in the packet headers, determine whether the received packet matches one or more prioritized data flow packet filters, select a source port number from the previously reserved range dedicated for high-priority data flows in response to determining that the received packet matches one or more prioritized data flow packet filters, modify the received uplink packet by replacing the private source IP address with a public IP address of the network apparatus and replacing the private source port number with the selected high-priority source port number. In some embodiments, the network apparatus processor may accomplish this by matching the packet against a packet filter containing a component "source internet protocol (IP) address", "destination IP address", "protocol number", "source port number", "destination port number", "Ethernet source MAC address", "Ethernet destination MAC address", etc., set to proper values (e.g., user-defined) for high-priority data flows.

In some embodiments, the at least one processor may be further configured to perform packet filtering for received DL WAN packets to determine the packet priority and the peripheral (e.g., WiFi/Ethernet/Bluetooth/USB) to route the packet, determine an updated destination IP address or updated destination port number for the downlink packet based on a corresponding network address translation (NAT) mapping stored in memory, modifying the received downlink packet to include the updated destination IP address or the updated destination port number, commence enqueuing the downlink packet into a downlink high-priority transmission queue of the interface of the next hop toward the destination IP address, in which the interface may be WiFi/Ethernet NIC/Bluetooth/USB, and forwarding the modified downlink packet to the next hop in the path towards the updated destination IP address, if the packet may be enqueued successfully.

In some embodiments, in the downlink (DL) direction, a standalone CPE functioning as a UE (CPE UE) may perform packet filtering prior to NAT operations to allow incoming packets to be routed effectively to the correct peripherals attached to the network system. In the uplink (UL) direction, the standalone CPE UE may undertake packet filtering subsequent to NAT. Such post-NAT filtering may allow the network system to route uplink packets to different DRBs. By implementing this bifurcated approach (e.g., filtering before NAT for downlink and filtering after NAT for uplink), the network system may manage many data flows with different priority levels using fewer filters and reducing latency and hardware costs.

The network apparatus processor may be configured to commence enqueuing the uplink packet into an uplink high-priority transmission queue, and forward the modified uplink packet to the next hop in the path towards the destination IP address in response to determining that the packet may be enqueued successfully.

In some embodiments, the processor may commence enqueuing the uplink packet into the uplink high-priority transmission queue by determining a priority level of the received uplink packet, determining a projected data radio bearer (DRB) buffer occupancy value that indicates a size of an uplink DRB buffer occupied by packets after adding the received uplink packet, determining whether the projected DRB buffer occupancy value exceeds a threshold value associated with the priority level of the received uplink packet, discarding the received uplink packet in response to determining that the projected DRB buffer occupancy value exceeds the threshold value associated with the priority level of the received uplink packet, and enqueuing the received uplink packet in response to determining that the projected DRB buffer occupancy value does not exceed the threshold value associated with the priority level of the received uplink packet.

In some embodiments, the processor may commence enqueuing the downlink packet into the uplink high-priority transmission queue by determining a priority level of the received downlink packet, determining a projected next-hop interface (e.g., WiFi/Ethernet NIC/Bluetooth/USB) buffer occupancy value that indicates a size of a downlink next-hop interface buffer occupied by packets after adding the received downlink packet, determining whether the projected downlink next-hop interface (e.g., WiFi/Ethernet NIC/Bluetooth/USB) buffer occupancy value exceeds a threshold value associated with the priority level of the received downlink packet, discarding the received downlink packet in response to determining that the projected downlink next-hop interface (e.g., WiFi/Ethernet NIC/Bluetooth/USB) buffer occupancy value exceeds the threshold value associated with the priority level of the received downlink packet, and enqueuing the received downlink packet in response to determining that the projected downlink next-hop interface (e.g., WiFi/Ethernet NIC/Bluetooth/USB) buffer occupancy value does not exceed the threshold value associated with the priority level of the received downlink packet.

Some embodiments may include or use a specialized packet filter component defined by 3GPP standards named "port range" or "IP address range." Some embodiments may use NAT functionality to map all data flows with the same priority level to a designated "port range." By centralizing data flows of the same priority into a specific port range or designated IP address range, the system may improve the efficiency of packet filtering and routing operations, which is especially beneficial in environments with high data rates and low latency requirements. Further, by aligning the approach with 3GPP standards, the network system may ensure interoperability as well as enhance the likelihood of adoption across various types of computing devices and networking environments.

In some embodiments, the "IP address range" may be determined by using an IPv4 address mask or an IPV6 address prefix length. For example, when configuring a packet filter, the component specifying the "source IP address 192.168.1.1 with a mask of 255.255.255.0" may match with a range of 256 source IP addresses, extending from 192.168.1.0 to 192.168.1.255. By implementing such IP address range matching schemes, network apparatuses implementing some embodiments may effectively consolidate what would otherwise require multiple individual packet filters into a single more robust filter. Various embodiments streamline packet routing operations without reducing efficiency or adding to hardware costs. In addition, defining a range of IP addresses and using the IP address ranges in packet filters in accordance with various embodiments may be in alignment with established networking standards (e.g., 3GPP, etc.), which may facilitate easier integration into existing systems and promote broader applicability.

In some embodiments, the network apparatuses may be configured to reserve a dedicated port range or designated IP address range for data flows with a specific priority level (e.g., "priority=x") to reduce or minimize the total number of packet filters used to segregate data based on priority. Said another way, the network apparatuses may reduce the total count of packet filters used for segregating data flows that meet the criteria of "priority=x" from other data flows.

In some embodiments, the network apparatuses may be configured to dynamically allocate resources based on the detected type of data flow. For example, the network apparatuses may allocate a larger portion of the UL buffer or give preferential treatment (e.g., in terms of CPU cycles, transmission opportunity, etc.) to real-time data flows, thereby lowering latency.

High-priority data, such as real-time audio calls, may coexist with low-priority data flows like background file synchronization. While the data rate for real-time audio might be relatively low (~100 Kbps), background file syncs could have much higher data rates and potentially cause the DRB buffer to reach its flow control threshold or even overflow. All new data may be dropped or halted when this occurs. As such, in some embodiments, the network apparatuses may be configured to reserve a dedicated portion of each DRB UL buffer specifically for high-priority data flows.

In some embodiments, the network apparatuses may be configured to implement a dual-threshold strategy and/or set two different buffer thresholds (e.g., "Threshold1," "Threshold2") within a DRB. Threshold1 may be set equal to the total DRB buffer occupancy (or buffer size, etc.) minus a pre-defined buffer occupancy of X Bytes reserved for high-priority data. Threshold2 may be the definitive buffer threshold and be set equal to the total DRB buffer occupancy. When data in the DRB buffer reaches the first threshold (Threshold1), the network apparatus may cease to accommodate any new normal-priority data but continue to allow the arrival of new high-priority data. For example, if the first threshold is reached and the dedicated high-priority buffer occupancy X is 50 KB, then any new normal-priority data would be dropped but incoming high-priority data would still be accepted into the reserved 50 KB buffer space. The network apparatus may cease to admit any new incoming data, regardless of its priority level, in response to reaching the second threshold (Threshold2) in the DRB buffer.

This dual-threshold strategy may serve to improve the quality of high-priority data flows by offering data flows a larger buffer depth and, consequently, a reduced packet loss rate when compared to normal-priority data flows. This may be particularly useful in scenarios in which the high-priority data is sensitive to latency and packet loss, such as VOIP calls or real-time video streaming.

In some embodiments, the network apparatuses may be configured to implement tiered thresholding and/or N Priority Levels (P1, P2, . . . , P_N) within a DRB, such as by establishing a series of N buffer thresholds within a DRB, to help ensure that higher-priority data is less likely to be dropped compared to lower-priority data.

In some embodiments, the network apparatuses may be configured to implement an N-threshold strategy and/or set N buffer thresholds within a DRB (e.g., if there are N priorities within a DRB (P1, P2, P3, . . . , P_N)). The N buffer thresholds may be a plurality of thresholds. For example, the N buffer thresholds may include Threshold_1, Threshold_2, . . . . Threshold_n, . . . , Threshold_(N−1), Threshold_N, in which: Threshold_1=[total DRB buffer occupancy]−X1 Bytes; Threshold_2=[total DRB buffer occupancy]−X1−X2 Bytes; Threshold_n=[total DRB buffer occupancy]−X1−X2 . . . X_n Bytes; Threshold_(N−1)= [total DRB buffer occupancy]−X1−X2 . . . X_(N−1) Bytes; and Threshold_N=[total DRB buffer occupancy].

When Threshold_1 is reached, new data arriving with priority=P1 may be enqueued and all other new data arrivals (e.g., with priority=(P2, . . . , P_N)) may be dropped. When Threshold_2 is reached, new data arriving with priority=(P1 or P2) may be enqueued and all other new data arrivals (e.g., with priority=(P3, . . . , P_N)) may be dropped. When Threshold_n is reached, new data arriving with priority=(P1, P2, . . . . P_n) may be enqueued and new data arrival with priority=(P_(n+1), . . . , P_N) may be dropped. When Threshold_(N−1) is reached, new data arriving with priority=(P1, P2, . . . . P_(N−1)) may be enqueued and new data arrivals with priority=P_N may be dropped. When Threshold_N is reached, all arriving new data may be dropped.

Network apparatuses implementing various embodiments may be well suited for inclusion in integrated wireless CPEs and/or other similar multifunctional devices that may serve dual roles as WiFi routers and cellular modems. Given their ability to handle multiple types of data flows, efficient data prioritization may be a significant technical challenge for such devices. Various embodiments may improve the performance and functioning of such multifunctional devices by reducing latency and hardware costs associated with handling multiple types of data flows.

Network apparatuses implementing various embodiments may improve the performance and functioning of computing devices and networks in which they are implemented. Such network apparatuses may reduce hardware costs through NAT Port range or designated IP address range prioritization, lower latency for high-priority data flows, and improve the efficiency of network resource allocation and usage. Additional benefits and improvements to the performance and functioning of computing devices will be evident from the disclosures in this application.

Figure 1B:
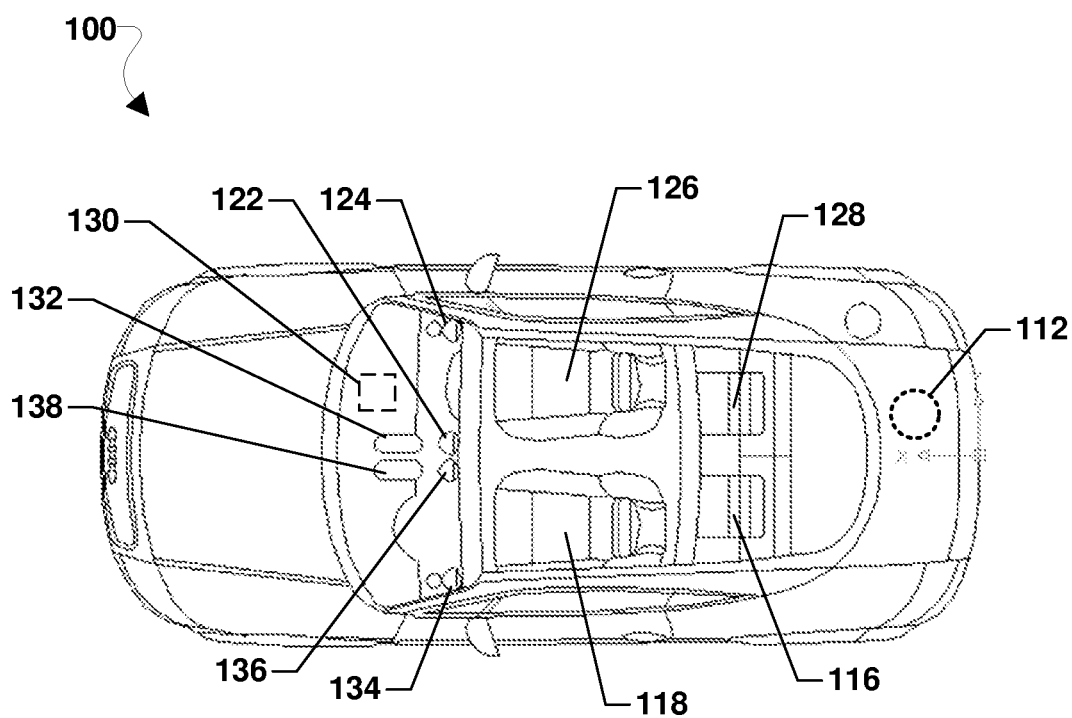

Various embodiments may be implemented within a variety of vehicles, an example vehicle 100 of which is illustrated in FIGS. 1A and 1B. With reference to FIGS. 1A and 1B, a vehicle 100 may include a processing system 140, and a plurality of sensors 102-138, including cameras 122, 136, radar 132, and lidar 138, as well as a suit of other sensors, such as satellite geopositioning system receivers 108, occupancy sensors 112, 116, 118, 126, 128, tire pressure sensors 114, 120, microphones 124, 134, impact sensors 130, etc. The plurality of sensors 102-138, disposed in or on the vehicle, may be used for various purposes, such as autonomous and semi-autonomous navigation and control, crash avoidance, position determination, etc., as well to provide sensor data regarding objects and people in or on the vehicle 100. The sensors 102-138 may include one or more of a wide variety of sensors capable of detecting a variety of information useful for navigation, collision avoidance, and autonomous and semi-autonomous navigation and control. Each of the sensors 102-138 may be in wired or wireless communication with the vehicle's processing system 140, as well as with each other.

In particular, the sensors may include one or more cameras 122, 136 or other optical sensors or photo optic sensors. Cameras 122, 136 or other optical sensors or photo optic sensors may include outward facing sensors imaging objects outside the vehicle 100 and/or in-vehicle sensors imaging objects (including passengers) inside the vehicle 100. In some embodiments, the vehicle may include multiple cameras, such as two frontal cameras with different fields of view (FOVs), four side cameras, and two rear cameras. The sensors may further include other types of object detection and ranging sensors, such as radar 132, lidar 138, IR sensors, and ultrasonic sensors. The sensors may be configured to provide data to a sensor processing module, which may be a neural network or AI model that has been trained to receive data from the sensors and output interpretations of the data (e.g., lane recognition, object recognition and classification, other vehicle locations and motion vectors, etc.) in a format useful by the vehicle self-driving system for safe navigation and operations.

Figure 1C:
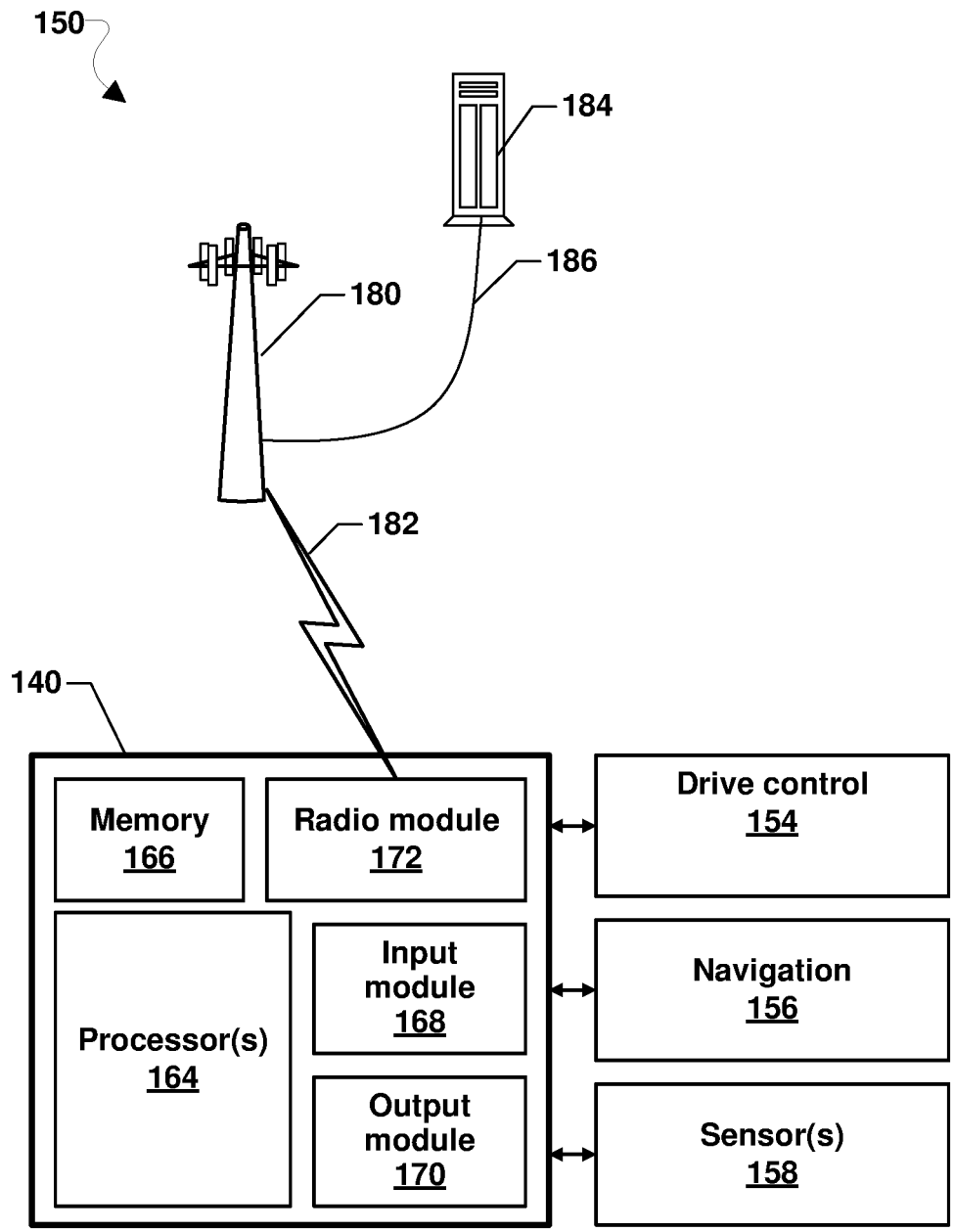
FIG. 1C is a component block diagram illustrating components of a vehicle suitable for implementing various embodiments.

FIG. 1C is a component block diagram illustrating a system 150 of a network apparatus and support systems suitable for implementing some embodiments in a vehicle. With reference to FIGS. 1A-1C, a vehicle 100 may include a processing system 140, which may include or be coupled to various circuits and devices used to control the operation of vehicle 100. In the example illustrated in FIG. 1C, the processing system 140 includes at least one processor 164, memory 166, an input module 168, an output module 170, and a radio module 172. The processing system 140 may be coupled to and configured to control drive control components 154, navigation components 156, and one or more sensors 158 of the vehicle 100. These components may be separate or integrated into a single module, such as a system-on-chip.

The radio module 172 may facilitate wireless communications, interacting with a network transceiver 180 to exchange signals 182, which may include commands for maneuvering and navigation data, such as from a network server 184 via a network 186. Input module 168 may receive data from sensors 158 and other system components. The output module 170 may transmit data to activate or interact with other components within the vehicle. The processing system 140 may interface with the drive control components 154 for maneuvering and navigation, including functionalities such as engine control, braking, and steering. Similarly, the processing system 140 may connect with navigation components 156 to determine the vehicle's current position and set the course for its destination. The processing system 140 may utilize Global Navigation Satellite System (GNSS) signals or other radio-based navigation methods.

Figure 2:
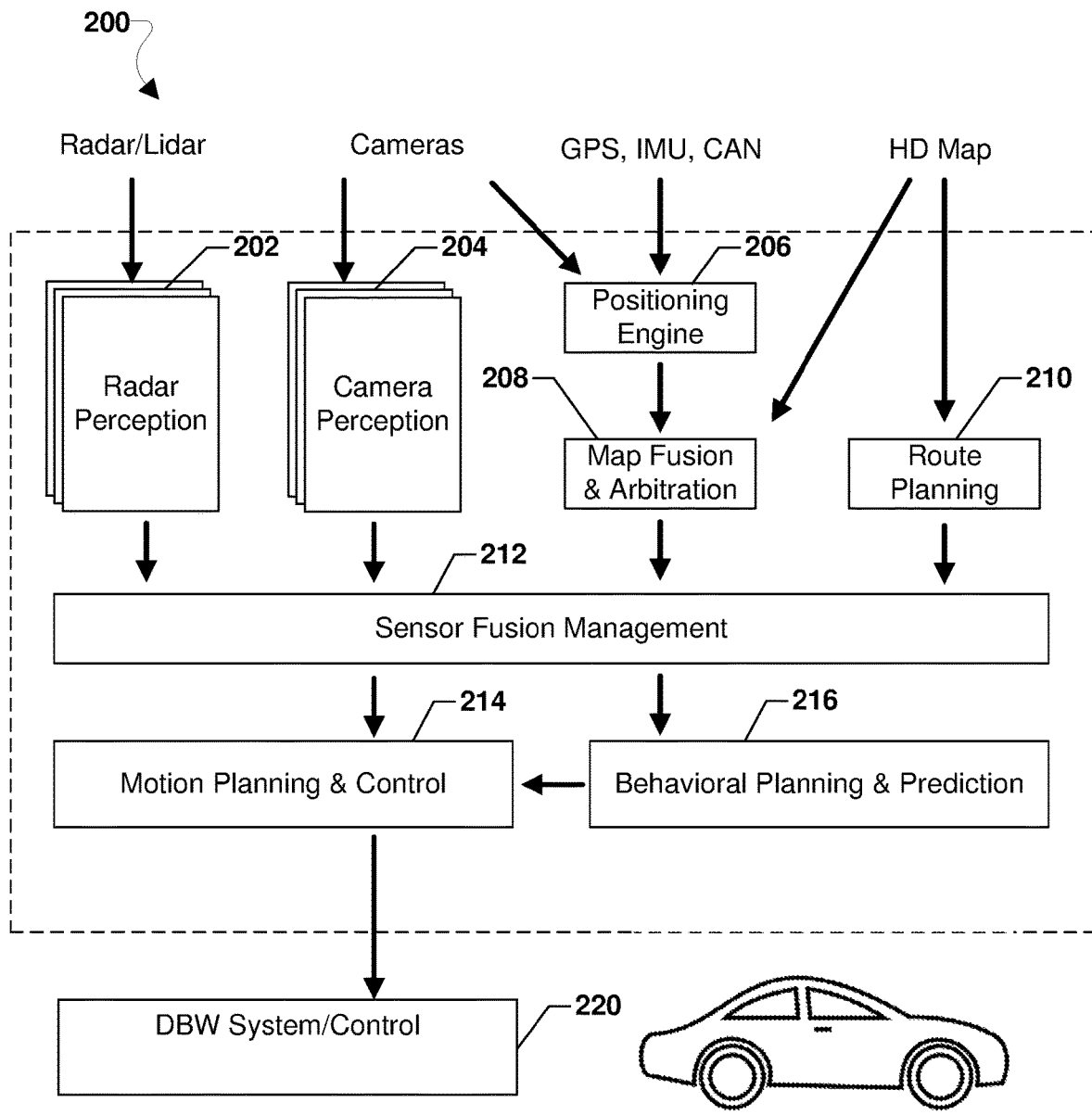
FIG. 2 is a component block diagram illustrating components and processing modules of an example vehicle management system suitable for implementing some embodiments.

FIG. 2 illustrates an example of subsystems, components, computational elements, computing devices, or units within a vehicle management system 200, which may be utilized within a vehicle 100. With reference to FIGS. 1A-2, in some embodiments multiple components, computing devices, or computational elements within the vehicle management system 200 may be part of an interconnected network of computing devices, or subsystems that exchange data and commands. In some embodiments, these computational elements or devices/components may be organized into different layers, each serving a specialized function. Examples of these layers include, but are not limited to, radar perception 202, camera perception 204, and positioning 206, among others, any or all of which may interact with each other to share data and computational results. Data sources for these layers may include sensors such as radar and lidar, navigation systems, vehicle networks, and databases. The vehicle management system 200 may generate output commands or signals that are interpreted and executed by a drive-by-wire system 220, which may directly interface with vehicle control systems.

The radar perception layer 202 may process data from detection sensors such as radar and lidar. The camera perception layer 204 processes visual data from cameras. The positioning engine layer 206 may use various sensors, including a GNSS receiver and an inertial measurement unit (IMU), to determine the vehicle's position. The map fusion and arbitration layer 208 further may refine the vehicle's position by accessing had high definition map database. The route planning layer 210 may use maps and inputs to plan a course for the vehicle. The sensor fusion layer 212 may integrate data from multiple sources to refine the vehicle's location and state. The motion planning layer 214 may generate control signals based on this information to manage the vehicle's motion safely. The behavioral planning layer 216 may use refined location and state data to predict future behaviors of other vehicles and objects. The drive-by-wire system 220 may receive control signals from the motion planning layer 214 and activate the corresponding mechanical controls in the vehicle. The drive-by-wire system 220 may also determine whether specific events warrant notifying a decision-maker within the vehicle.

Figure 3:
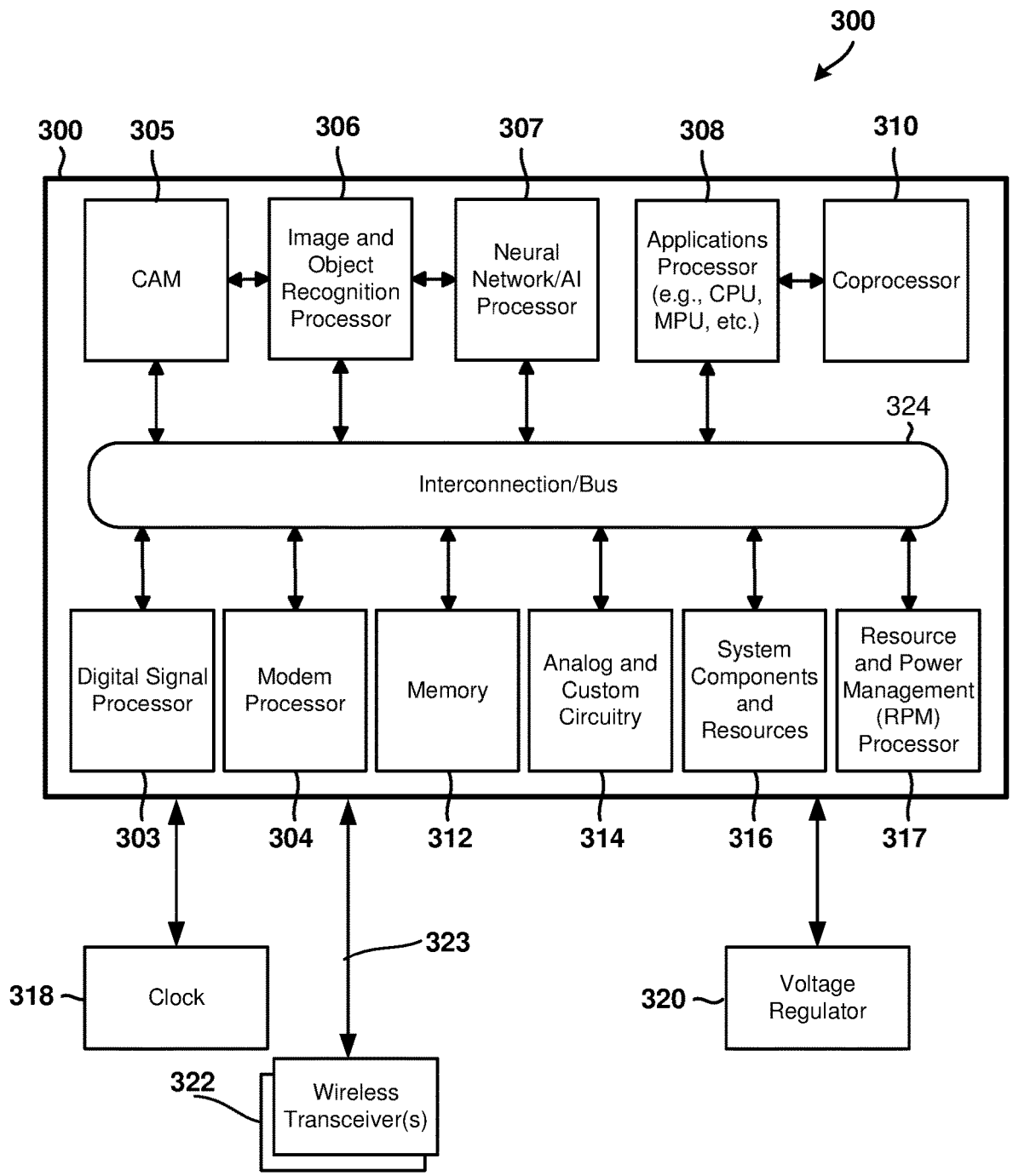
FIGS. 3 and 4 are block diagrams illustrating components for use in a network apparatus for use with customer premise equipment (CPE) or in vehicles that may be configured to implement any of the various embodiments.

FIG. 3 illustrates an example system-on-chip (SOC) architecture of a SOC 300 suitable for implementing various embodiments in a network apparatus for use in vehicle or CPE networks. With reference to FIGS. 1A-3, the SOC 300 may include a number of heterogeneous processors, such as a digital signal processor (DSP) 303, a modem processor 304, an image and object recognition processor 306, a neural network/AI processor 307, an applications processor 308, and a resource and power management (RPM) processor 317. The SOC 300 may also include one or more coprocessors 310 (e.g., vector co-processor) connected to one or more of the heterogeneous processors 303, 304, 306, 307, 308, 317. Each of the processors may include one or more cores, and an independent/internal clock. Each processor/core may perform operations independent of the other processors/cores. For example, the SOC 300 may include a processor that executes a first type of operating system (e.g., FreeBSD, LINUX, OS X, etc.) and a processor that executes a second type of operating system (e.g., Microsoft Windows). In some embodiments, the applications processor 308 may be the SOC's 300 main processor, central processing unit (CPU), microprocessor unit (MPU), arithmetic logic unit (ALU), etc. The graphics processor 306 may be graphics processing unit (GPU).

The SOC 300 may include analog circuitry and custom circuitry 314 for managing sensor data, analog-to-digital conversions, wireless data transmissions, and for performing other specialized operations, such as processing encoded audio and video signals for rendering in a web browser. The SOC 300 may further include system components and resources 316, such as voltage regulators, oscillators, phase-locked loops, peripheral bridges, data controllers, memory controllers, system controllers, access ports, timers, and other similar components used to support the processors and software clients (e.g., a web browser) running on a computing device.

The SOC 300 may also include specialized circuitry for camera actuation and management (CAM) 305 that includes, provides, controls and/or manages the operations of one or more cameras 122, 136 (e.g., a primary camera, webcam, 3D camera, etc.), the video display data from camera firmware, image processing, video preprocessing, video front-end (VFE), in-line JPEG, high definition video codec, etc. The CAM 305 may be an independent processing unit and/or include an independent or internal clock.

The system components and resources 316, analog and custom circuitry 314, and/or CAM 305 may include circuitry to interface with peripheral devices, such as cameras 122, 136, radar 132, lidar 138, electronic displays, wireless communication devices, external memory chips, etc. The processors 303, 304, 306, 307, 308 of a processing system may be interconnected to one or more memory elements 312, system components and resources 316, analog and custom circuitry 314, CAM 305, and RPM processor 317 via an interconnection/bus module 324, which may include an array of reconfigurable logic gates and/or implement a bus architecture (e.g., CoreConnect, AMBA, etc.). Communications may be provided by advanced interconnects, such as high-performance networks-on chip (NoCs).

The SOC 300 may further include an input/output module (not illustrated) for communicating with resources external to the SOC, such as a clock 318 and a voltage regulator 320. Resources external to the SOC (e.g., clock 318, voltage regulator 320) may be shared by two or more of the internal SOC processors/cores (e.g., a DSP 303, a modem processor 304, a graphics processor 306, an applications processor 308, etc.). The SOC 300 may further include one or more wireless transceivers 322 configured to send and receive wireless communications via an antenna (not shown) to/from a wireless device (e.g., network transceiver 180). In some embodiments, the wireless transceivers 322 may be wireless transceivers configured to support peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), Bluetooth communications, Wi-Fi communications, etc. In some embodiments, the wireless transceivers 322 may be connected to the SOC 300 by various physical connections 323 (also referred to as interconnects, buses, etc.), such as peripheral component interconnect express (PCIe) connections, universal serial bus (USB) connections, high speed inter-chip (HSIC) connections, Ethernet connections, etc. In various embodiments, the SOC 300 may be configured to selectively send data, such as IP packets, to the wireless transceivers 322 using different ones of the connections 323.

In some embodiments, the SOC 300 may be included in a processing system (e.g., 140) for use in a vehicle (e.g., 100). In some embodiments, the SOC 300 may be included in a processing system (e.g., 140) for use in a network apparatus. The processing system may include communication links for communication with a wireless network (e.g., 180), the Internet, and/or a network server (e.g., 184) as described.

Figure 4:
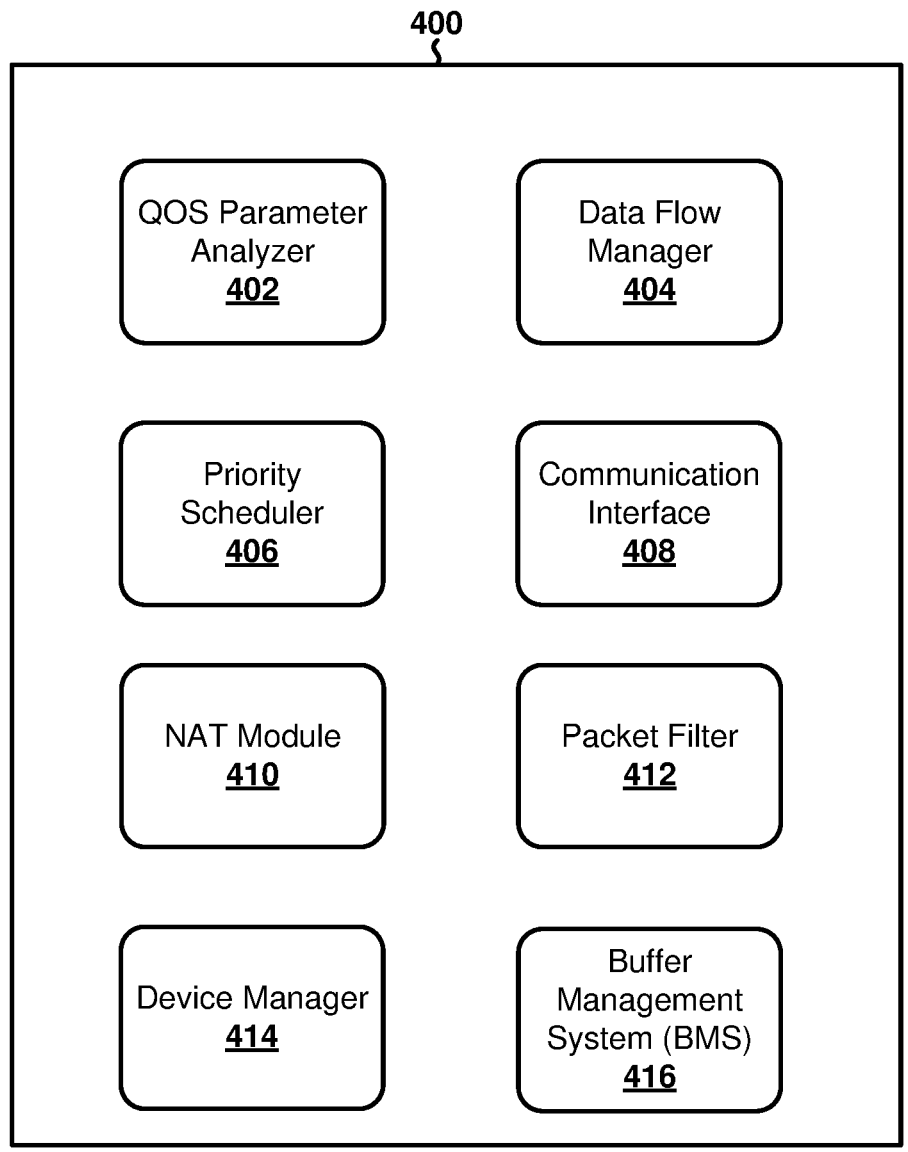

FIG. 4 illustrates example components that could be included in a network apparatus that is configured to implement various embodiments. With reference to FIGS. 1A-4, a network apparatus 400 may include a quality of service (QOS) parameter analyzer 402, a data flow manager 404, a priority scheduler 406, a communication interface 408, a network address translation (NAT) module 410, a packet filter 412, a device manager 414, and a Buffer Management System (BMS) 416. The network apparatus may also include a processing system that includes one or more processors (e.g., 303-310, 317, etc.) that perform the core computational tasks related to packet filtering, NATing, DRB management, etc.

The QOS parameter analyzer 402 may be configured to evaluate and classify incoming and outgoing data flows based on predetermined quality of service parameters such as latency, packet error rate, and bit rate. The data flow manager 404 may be configured to work in conjunction with the QoS parameter analyzer 402 to classify and segregate incoming and outgoing data flows into uplink and downlink buffers based on their QoS requirements. The priority scheduler 406 may be configured to interact with the data flow manager 404 to dynamically allocate resources, determine the sequence of data packet transmission in both uplink and downlink directions, prioritize these high-urgency data packets in the sequence, control the data packet transmission sequence in uplink and downlink directions, and apply/enforce a higher priority for data flows that require low latency, etc. The communication interface 408 may be configured to facilitate the data packet exchanges between the network apparatus and the base station (eNB, gNB, etc.). The NAT module 410 may be configured to assign specific NAT port ranges or designated IP address ranges based on the priority level of the data flow or device. The packet filter 412 component may be configured to perform packet filtering operations based on port ranges or IP address ranges. The device manager 414 may be configured to allow users to define and configure packet filters and associate them with previously defined priority levels. The BMS 416 may be configured to interact closely with the device manager 414, priority scheduler 406, and data flow manager 404 components to dynamically allocate buffer spaces within each DRB based on the priority of the data flow.

The network apparatus processing system may be configured to initialize the system by defining various priority levels (e.g., high, medium, low, etc.), associating these defined priority levels with specific NAT port ranges or designated IP address ranges, scanning the headers of an incoming uplink packet to determine its priority level, assigning a port from the dedicated port range or designated IP address range to the incoming packet based on the priority level, and queuing the modified packet for transmission.

In some embodiments, a network apparatus may be configured to reserve a dedicated port range or designated IP address range for data flows with a specific priority level (e.g., "priority=x") to reduce or minimize the total number of packet filters used to segregate data based on priority. Said another way, the network apparatus may reduce the total count of packet filters used for segregating data flows that meet the criteria of "priority=x" from other data flows.

The device manager 414 component may be configured to assign a priority to certain data flows. For example, consider a filter configured as "filter1" with destination IP address 1.1.1.1 and associated with "priority=x" and a NAT module configured to reserve a IP address range or public port range (e.g., 60000-61000) dedicated specifically for data flows of "priority=x" for a LAN interface (e.g., WiFi, etc.). In some embodiments, the operations may be triggered by a WiFi client (e.g., WiFi client 1) sending a data packet that matches the predetermined conditions set in "filter1" associated with destination IP address 1.1.1.1.

The network apparatus 400 may receive a first uplink (UL) packet from LAN client 1. The packet may include the following attributes: Source IP: 192.168.1.100 (Private IP address); Source Port: 10000; Destination IP: 1.1.1.1; Destination Port: 80. In response to receiving the packet, the computing system 400 may identify the need for new NAT operations and forward the packet to the NAT module 410. The NAT module 410 may determine that the UL packet fits the criteria set in "filter1" (e.g., destination IP address is 1.1.1.1). In response, the NAT module 410 may perform the NAT operations with a source port number selected from the range reserved (60000-61000) specifically for "priority=x" data flows. After these operations, the new packet attributes become Source IP: 70.2.2.2 (Public IP address of CPE); Source Port: 20001; Destination IP: 1.1.1.1; Destination Port: 80.

The network apparatus 400 may receive a downlink (DL) packet that corresponds to the UL packet discussed above. In response, the network apparatus 400 may use a single filter with the component "port range" set to 60000-61000 to segregate all downlink packets with "priority=x" that are to be routed to the LAN interface (e.g., WiFi, etc.). The network apparatus 400 may then perform the NAT operation for the DL packet. The network apparatus 400 may continue to use the same NAT mapping for subsequent uplink or downlink packets belonging to the data flow that matches "filter1."

That is, for downlink packets, the network apparatus (e.g., via the packet filter 412, etc.) may identify the priority level of incoming packets and route them through the appropriate DRB, and apply NAT settings (e.g., via the NAT module 410) based on pre-defined configurations. After the transmission is complete, the network apparatus may (e.g., via NAT module 410) save the NAT settings for data flows. This may allow the network apparatus to quickly process future packets that match the same filter. These streamlined packet filtering operations may reduce overall latency by reducing the amount of time it takes to identify and route packets. Further, this system allows for the consolidation of packet filters, which may in turn reduce hardware costs.

Figure 5A:
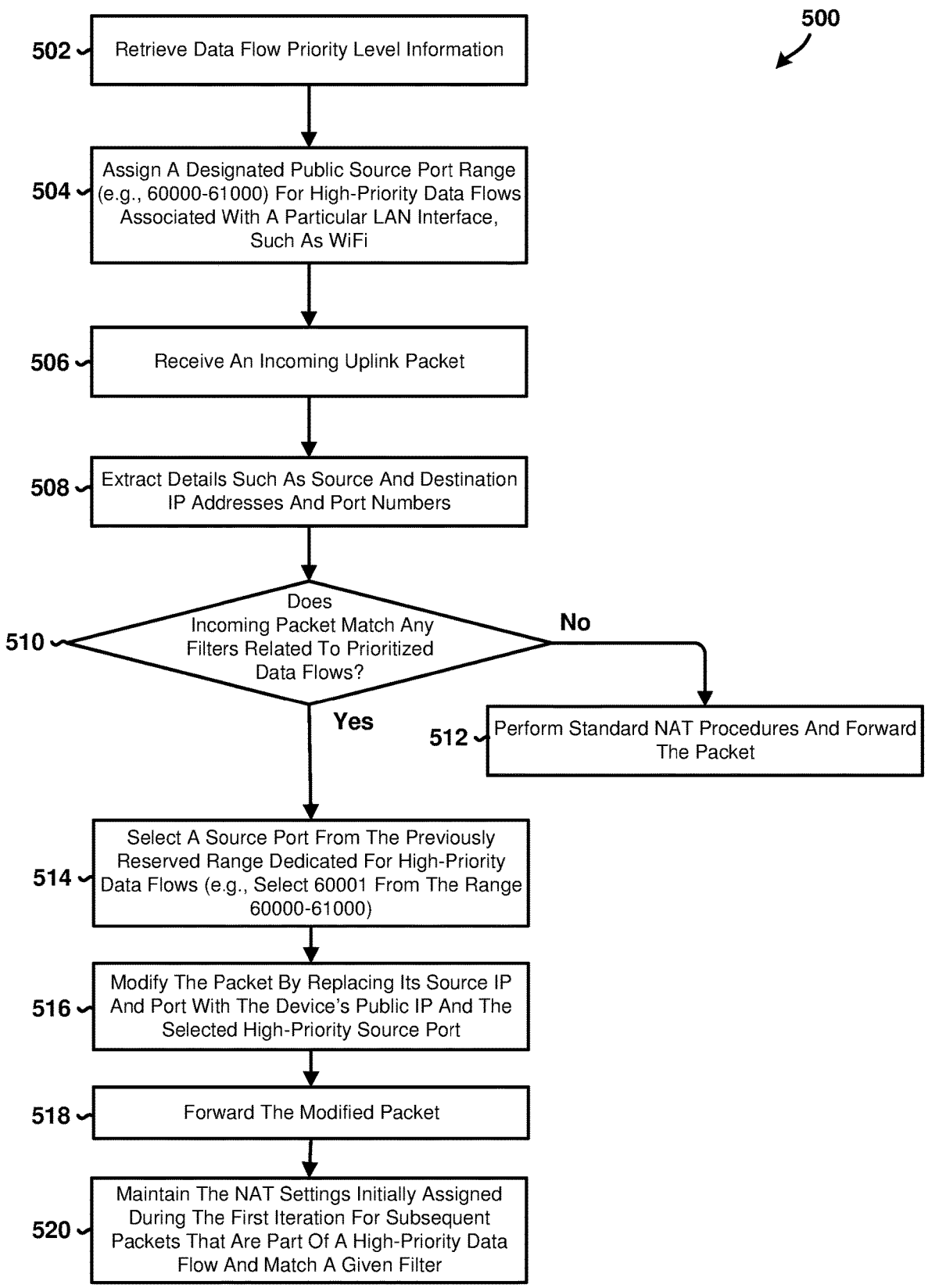
FIGS. 5A and 5B are process flow diagrams illustrating methods of processing packets in accordance with some embodiments.
Figure 5B:
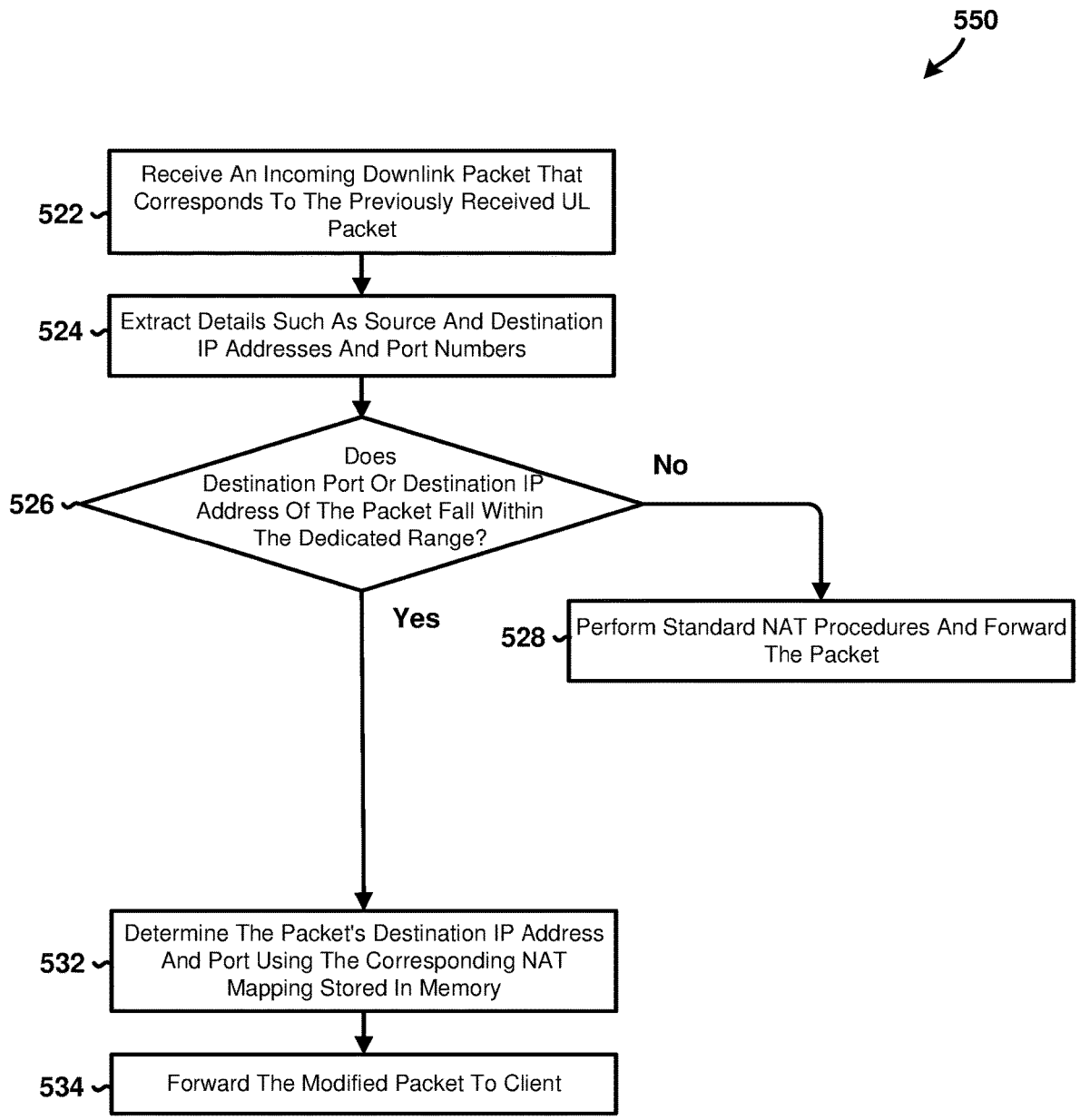

FIGS. 5A and 5B are process flow diagrams illustrating methods 500, 550 of processing packets that may be implemented in a network apparatus in accordance with some embodiments. With reference to FIGS. 1-5B, the methods 500, 550 may be performed in a network apparatus by a processing system encompassing a memory and at least one processor (e.g., 303-310, 317, etc.), components or subsystems discussed in this application. Means for performing the functions of the operations in the methods 500, 550 may include memory (e.g., 312), a processing system including at least one processor (e.g., 303-310, 317, etc.), and other components described herein. Further, one or more processors of a network apparatus processing system may be configured with software or firmware to perform some or all of the operations of the methods 500, 550. In order to encompass the alternative configurations enabled in various embodiments, the hardware implementing any or all of the methods 500, 550 is referred to herein as "at least one processor."

For the sake of clarity and ease of presentation, the methods 500, 550 are presented as separate embodiments. While each method is delineated for illustrative purposes, it should be clear to those skilled in the art that various combinations or omissions of these methods, blocks, operations, etc. could be used to achieve a desired result or a specific outcome. It should also be understood that the descriptions herein do not preclude the integration or adaptation of different embodiments of the methods, blocks, operations, etc. to produce a modified or alternative result or solution. The presentation of individual methods, blocks, operations, etc. should not be interpreted as mutually exclusive, limiting, or as being required unless expressly recited as such in the claims.

For the sake of clarity and ease of presentation, specific components described with reference to FIGS. 5A and 5B are identified as performing specific operations of methods 500, 550. However, it should be understood that in the various embodiments, the operations in block 500, 550 may be performed by any or all of the components illustrated and described with reference to FIGS. 1-5 or described anywhere in this application.

In block 502, at least one processor may retrieve or determine data flow priority level information. In some embodiments, the at least one processor may determine data flow priority level information based on user configurations. End-users may configure and establish data flow priorities by accessing a Customer Premises Equipment (CPE) or a WiFi router through an application or a web user interface. For example, end-users may opt to elevate the priority of all network traffic originating from a specific computer designated for work-from-home purposes. As another example, the end-users may choose to prioritize traffic associated with particular remote IP addresses or specific remote server port numbers.

In some embodiments, the at least one processor may determine data flow priority level information based on characteristics of the Original Equipment Manufacturer (OEM) configuration, such as from an automotive manufacturer. The OEM may include important insights into the defining attributes of important data flows, including local or remote IP addresses and other relevant parameters. The OEM may configure packet filters that include components such as local or remote IP addresses with values that align with those of the data flows.

In some embodiments, the at least one processor may determine data flow priority level information based on an additional autonomous module integrated into the UE, CPE, or Automotive UE that monitors, classifies, and/or prioritizes the data flows and their associated traffic patterns.

In block 504, the at least one processor may assign a designated public port range (e.g., 60000-61000) for high-priority data flows associated with a particular LAN interface, such as WiFi.

In block 506, the at least one processor may receive an incoming uplink packet.

In block 508, the at least one processor may extract details from received uplink packet, such as source and destination IP addresses and port numbers.

In determination block 510, the at least one processor may determine whether the incoming packet matches any filters related to prioritized data flows.

In response to determining that the incoming packet does not match any filters related to prioritized data flows (i.e., determination block 510="No"), the at least one processor may perform standard NAT procedures and forward the packet to its destination in block 512.

In response to determining that the incoming packet matches a filter related to prioritized data flows (i.e., determination block 510="Yes"), the at least one processor may select a source port from the previously reserved range dedicated for high-priority data flows (e.g., select 20001 from the range 60000-61000) in block 514.

In block 516, the at least one processor may modify the packet by replacing its source IP and port with the device's public IP and the selected high-priority source port.

In block 518, the at least one processor may forward the modified packet to its destination.

In block 520, the at least one processor may maintain the NAT settings initially assigned during the first iteration for subsequent packets that are part of a high-priority data flow and match a given filter.

In block 522, the at least one processor may receive an incoming downlink (DL) packet that corresponds to the previously received UL packet.

In block 524, the at least one processor may extract details such as source and destination IP addresses and port numbers from the received DL packet.

In block 526, the at least one processor may determine whether the destination port of the packet falls within the dedicated port range, or whether the destination IP address of the packet falls within the designated IP address range.

In response to determining that the destination port of the packet does not fall within the dedicated port range or the destination IP address of the packet does not fall within the designated IP address range (i.e., determination block 526="No"), the at least one processor may perform standard NAT procedures and forward the packet in block 528.

In response to determining that the destination port of the packet falls within the dedicated port range or the destination IP address of the packet falls within the designated IP address range (i.e., determination block 526="Yes"), the at least one processor may determine the packet's destination IP address and port using the corresponding NAT mapping stored in memory in block 532.

In block 534, the at least one processor may forward the modified packet to the client or to the next-hop.

Figure 6A:
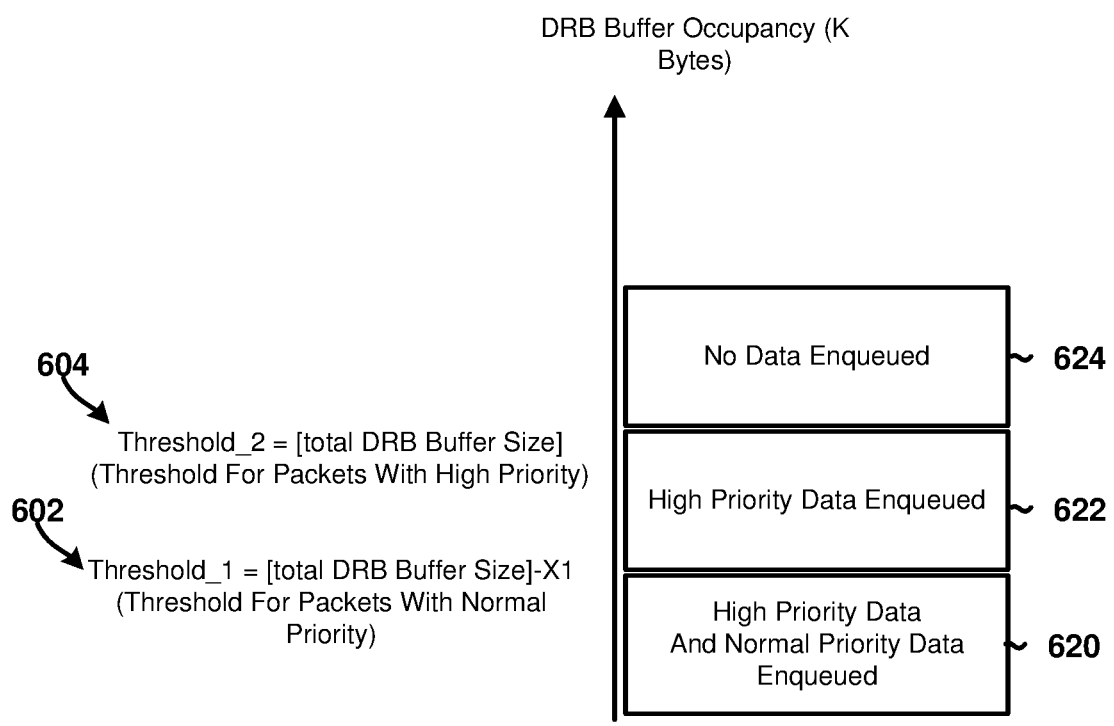
FIG. 6A is a component block diagram illustrating components and operations in a system configured to implement a dual-threshold strategy and/or set two different buffer thresholds within a DRB in accordance with some embodiments.

FIG. 6A illustrates components and operations in a network apparatus configured to implement a dual-threshold strategy and/or set two different buffer thresholds within a DRB in accordance with some embodiments. This dual-threshold strategy may serve to improve the quality of high-priority data flows by offering them a larger buffer depth and, consequently, a reduced packet loss rate when compared to normal-priority data flows. This may be particularly useful in scenarios in which the high-priority data is sensitive to latency and packet loss, such as VOIP calls or real-time video streaming.

The first threshold 602 (Threshold_1) may be set equal to the total DRB buffer occupancy minus a pre-defined buffer occupancy X Bytes reserved for high-priority data. The second threshold 604 (Threshold_2) may be the definitive buffer threshold and set equal to the total DRB buffer occupancy. The first threshold 602 may be the threshold for packets with high priority and the second threshold 604 may be the threshold for packets with normal priority.

In block 620, the network apparatus may enqueue high-priority data and normal-priority data.

In block 622, the network apparatus may cease to accommodate any new normal-priority data but continue to allow the arrival of new high-priority data in response to determining that the data in the DRB buffer exceeds the first threshold 602. For example, if the dedicated high-priority buffer occupancy X is 50 KB, the network apparatus may drop all new normal-priority data but continue to accept high-priority data into the reserved 50 KB buffer space in response to determining that the first threshold 602 has been exceeded.

In block 624, the network apparatus may cease to admit any new incoming data, regardless of its priority level, in response to determining that the second threshold 604 has been exceeded.

Figure 6B:
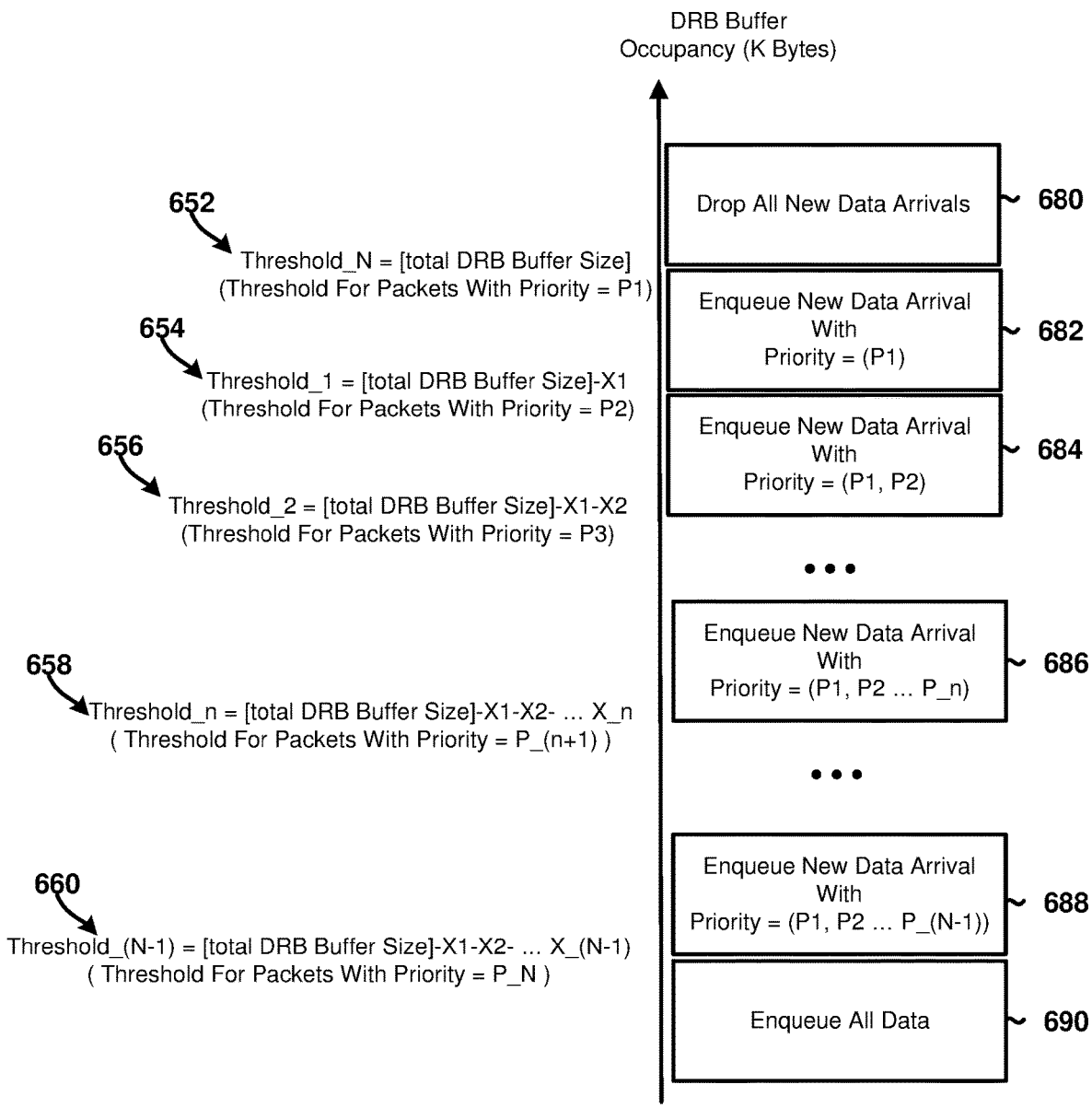
FIG. 6B is a component block diagram illustrating components and operations in a system configured to implement a tiered thresholding strategy in accordance with some embodiments.

FIG. 6B illustrates components and operations in a network apparatus configured to implement a tiered thresholding strategy in accordance with some embodiments. The tiered thresholding strategy may support N Priority Levels (P1, P2, . . . , P_N) within a DRB and/or may include establishing a series of N buffer thresholds within a DRB to help ensure that higher-priority data is less likely to be dropped compared to lower-priority data. FIG. 6A is a simplified version of FIG. 6B.

In the example illustrated in FIG. 6B, there are a plurality of thresholds that include Threshold_N 652, Threshold_1 654, Threshold_2 656, Threshold_n 658, and Threshold_(N−1) 660. Threshold_N 652 may be set equal to the total DRB buffer occupancy. Threshold_1 654 may be set equal to the total DRB buffer occupancy-X1 Bytes. Threshold_2 656 may be set equal to the total DRB buffer occupancy-X1-X2 Bytes. Threshold_n 658 may be set equal to the total DRB buffer occupancy-X1-X_n Bytes. Threshold_(N−1) 660 may be set equal to the total DRB buffer occupancy-X1-X_(N−1) Bytes.

Threshold_N 652 may be the threshold for packets with priority=P1, Threshold_1 654 may be the threshold for packets with priority=P2, Threshold_2 656 may be the threshold for packets with priority=P3, Threshold_n 658 may be the threshold for packets with priority=P_(n+1), and Threshold_(N−1) 660 may be the threshold for packets with priority=P_N.

In block 680, the network apparatus may drop all new data arrivals in response to determining that Threshold_N has been reached.

In block 682, the network apparatus may commence enqueuing new data arrivals with priority=P1 and dropping all other new data arrivals (e.g., with priority=(P2, . . . , P_N)) in response to determining that Threshold_1 654 has been reached or exceeded.

In block 684, the network apparatus may commence enqueuing new data arrivals with priority=P1 or P2 and dropping all other new data arrivals (e.g., with priority=(P3, . . . , P_N)) in response to determining that Threshold_2 656 has been reached or exceeded.

In block 686, the network apparatus may commence enqueuing new data arrivals with priority=(P1, P2, . . . . P_n) and dropping all other new data arrivals (e.g., with priority=(P_(n+1), . . . , P_N)) in response to determining that Threshold_n 658 has been reached or exceeded.

In block 688, the network apparatus may commence enqueuing new data arrivals with priority=(P1, P2, . . . . P_(N−1)) and dropping all other new data arrivals (e.g., with priority=P_N) in response to determining that Threshold_(N−1) 660 has been reached or exceeded.

In block 690, the network apparatus may commence enqueuing all new data arrivals regardless of priority.

Figure 7:
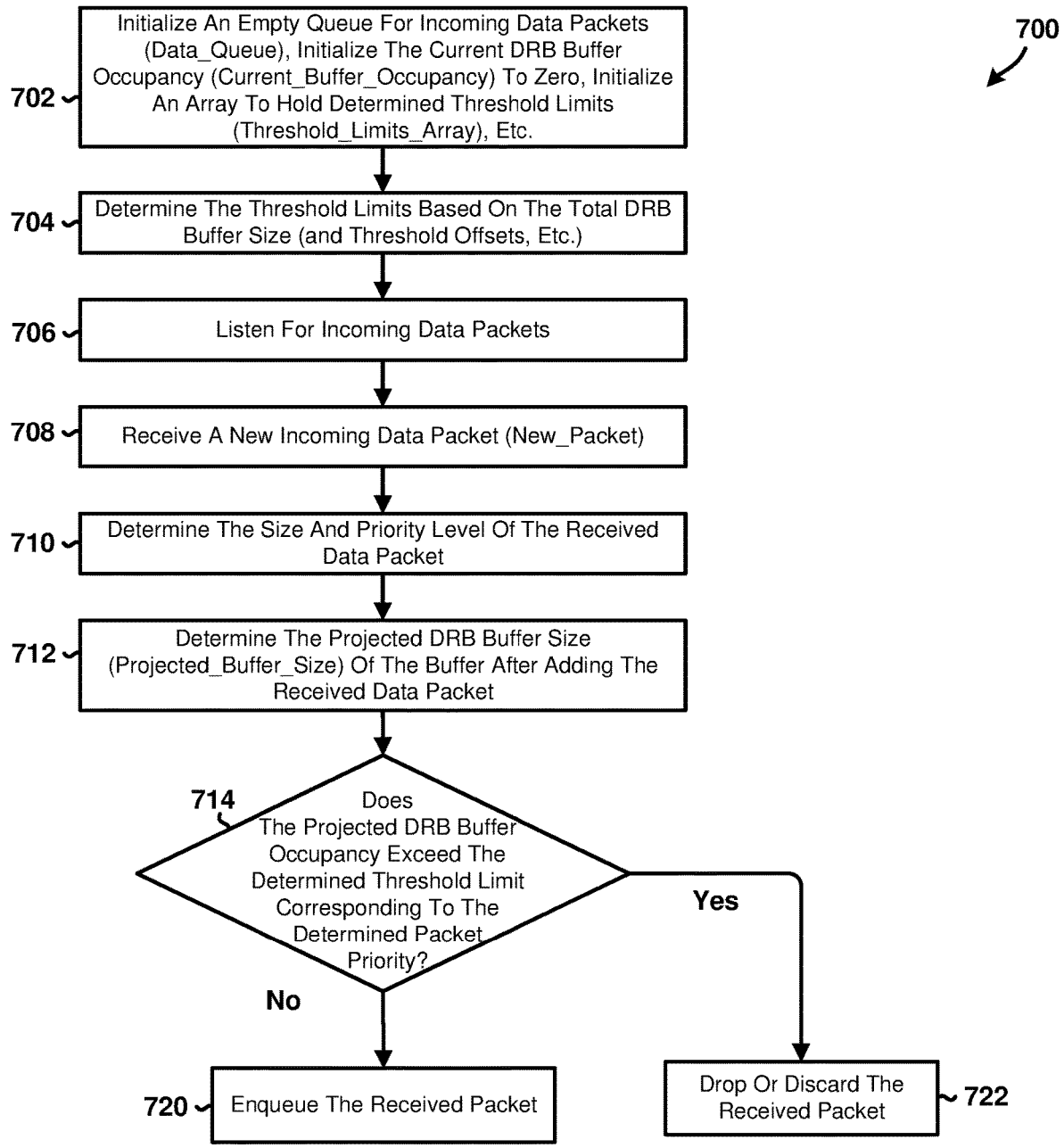
FIG. 7 is a process flow diagram illustrating a method of implementing a tiered threshold strategy in accordance with some embodiments.

FIG. 7 is a process flow diagram illustrating a method 700 of implementing a tiered threshold strategy in a network apparatus in accordance with some embodiments. With reference to FIGS. 1-7, the method 700 may be performed in a network apparatus by a processing system encompassing a memory (e.g., 312) and at least one processor (e.g., 303-310, 317, etc.), components or subsystems discussed in this application. Means for performing the functions of the operations in the method 700 may include memory, a processing system including at least one processor (e.g., 303-310, 317, etc.), and other components described herein. Further, one or more processors of the processing system may be configured with software or firmware to perform some or all of the operations of the method 700. In order to encompass the alternative configurations enabled in various embodiments, the hardware implementing any or all of the method 700 is referred to herein as "at least one processor."

For the sake of clarity and ease of presentation, the methods 500, 550, 700 are presented as separate embodiments. While each method is delineated for illustrative purposes, it should be clear to those skilled in the art that various combinations or omissions of these methods, blocks, operations, etc. could be used to achieve a desired result or a specific outcome. It should also be understood that the descriptions herein do not preclude the integration or adaptation of different embodiments of the methods, blocks, operations, etc. to produce a modified or alternative result or solution. The presentation of individual methods, blocks, operations, etc. should not be interpreted as mutually exclusive, limiting, or as being required unless expressly recited as such in the claims.

For the sake of clarity and ease of presentation, specific components are described with reference to FIG. 7 are identified as performing specific operations of the method 700. However, it should be understood that in the various embodiments, the operations of the method 700 may be performed by any or all of the components illustrated and described with reference to FIGS. 1-7 or described anywhere in this application.

In block 702, the at least one processor may perform various initialization operations. For example, the at least one processor may initialize an empty queue for incoming data packets, initialize a current DRB buffer occupancy parameter (e.g., Current_Buffer_Occupancy, etc.) to zero, and initialize an array to hold calculated threshold limits (e.g., Threshold_Limits_Array, etc.).

In block 704, the at least one processor may determine the threshold limits based on the total DRB buffer occupancy (and threshold offsets, etc.). For example, the at least one processor may perform the operations {For i=1 to: {Threshold_Limit_i=Total_Buffer_Size−(X1+X2+ . . . +X_i); Append Threshold_Limit_i to Threshold_Limits_Array}}.

In block 706, the at least one processor may commence listening to incoming data packets while the system is operational.

In block 708, the at least one processor may receive a new incoming data packet (e.g., New_Packet, etc.).

In block 710, the at least one processor may determine the packet size (e.g., New_Packet_Size, etc.) and priority level (e.g., New_Packet_Priority, etc.) of the received data packet.

In block 712, the at least one processor may determine the projected DRB buffer occupancy (Projected_Buffer_Size), which indicates the size of the DRB buffer if the received data packet were to be added to the buffer.

In determination block 714, the at least one processor may determine whether the projected DRB buffer occupancy exceeds a determined threshold limit corresponding to the determined packet priority. In various embodiments, the at least one processor may determine whether the projected DRB buffer occupancy exceeds any of the determined threshold limits. For example, the at least one processor may iterate through the determined threshold limits by performing operations such as {For i=1 to N: Is Projected_Buffer_Size>Threshold_Limits_Array[i]}.

In response to determining that the projected DRB buffer occupancy exceeds the determined threshold limit corresponding to the determined packet priority (i.e., determination block 714="Yes"), the at least one processor may drop or discard the received packet in block 722.

In response to determining that the projected DRB buffer occupancy does not exceed the determined threshold limit corresponding to the determined packet priority (i.e., determination block 714="No"), may enqueue the received packet in block 720.

Figure 8:
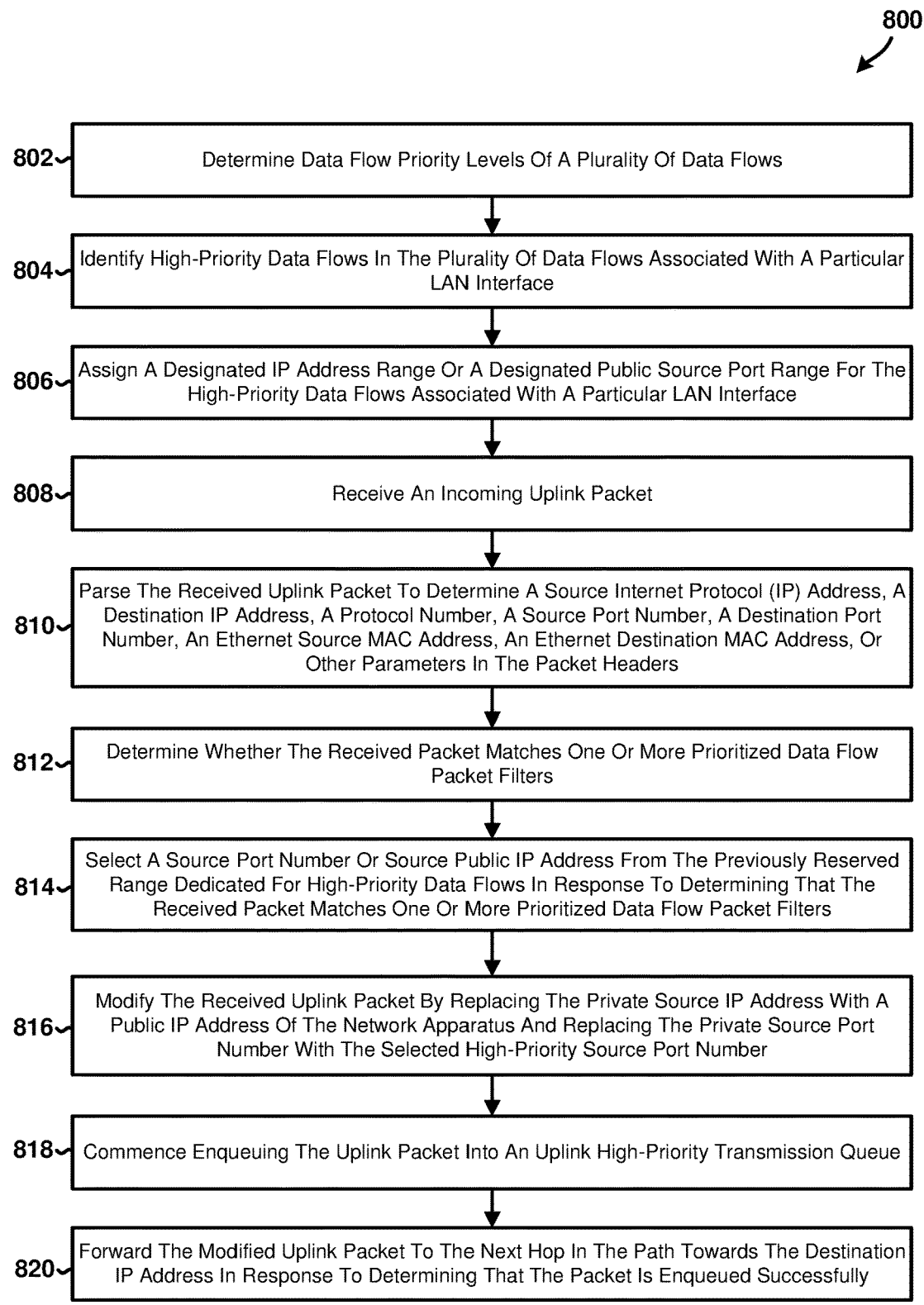
FIG. 8 is a process flow diagram illustrating a method of managing mixed data flow types in accordance with some embodiments.

FIG. 8 is a process flow diagram illustrating a method 800 of managing mixed data flow types in a network apparatus in accordance with some embodiments. With reference to FIGS. 1-8, the method 800 may be performed in a network apparatuses by a processing system encompassing a memory (e.g., 312) and at least one processor (e.g., 303-310, 317, etc.), components or subsystems discussed in this application. Means for performing the functions of the operations in the method 800 may include memory, a processing system including at least one processor (e.g., 303-310, 317, etc.), and other components described herein. Further, one or more processors of the processing system may be configured with software or firmware to perform some or all of the operations of the method 800. In order to encompass the alternative configurations enabled in various embodiments, the hardware implementing any or all of the method 800 is referred to herein as "at least one processor."

For the sake of clarity and ease of presentation, the methods 500, 550, 700, 800 are presented as separate embodiments. While each method is delineated for illustrative purposes, it should be clear to those skilled in the art that various combinations or omissions of these methods, blocks, operations, etc. could be used to achieve a desired result or a specific outcome. It should also be understood that the descriptions herein do not preclude the integration or adaptation of different embodiments of the methods, blocks, operations, etc. to produce a modified or alternative result or solution. The presentation of individual methods, blocks, operations, etc. should not be interpreted as mutually exclusive, limiting, or as being required unless expressly recited as such in the claims.

For the sake of clarity and ease of presentation, specific components described with reference to FIG. 8 are identified as performing specific operations of the method 800. However, it should be understood that in the various embodiments, the operations of the method 800 may be performed by any or all of the components illustrated and described with reference to FIGS. 1-8 or described anywhere in this application.

It should be understood that in some embodiments, the operations in blocks 802, 806, 808, 810, 812, 813, 814, 820 may be the same or similar to the operations in blocks 502, 504, 506, 508, 510, 514, 516, 518 discussed above.

In block 802, the at least one processor may determine data flow priority levels of a plurality of data flows. For example, the processor may evaluate various data streams in the network to determine priority levels based on the nature of the data, its source, destination, or other criteria. In some embodiments, the priority levels may be defined and associated with specific NAT port ranges or designated IP address ranges. Establishing predefined priority levels may reduce the complexity of the packet filtering operations and/or allow for more efficient queue management operations. In some embodiments, the processor may associate specific NAT port ranges or designated IP address ranges with particular QoS requirements to streamline QoS enforcement processes.

The priority determination is important for addressing the technical challenges associated with managing mixed data flow types in modern wireless automotive and CPE network deployments, such as the technical challenges that arise when latency-sensitive real-time services, such as VoIP or video conferencing, share the same resources as latency-tolerant flows such as file synchronization. By evaluating various data streams in the network and assigning priority levels, the processor may effectively address the co-existence of latency-sensitive and latency-tolerant data flows, improve the use of network resources, and provide the high-priority flows with the necessary bandwidth and lower latency.

In block 804, the at least one processor may identify high-priority data flows in the plurality of data flows associated with a particular LAN interface. For example, the processor may identify the data flows that are of high priority and manage their transport through a particular network segment associated with the specific LAN interface. That is, the identification of the high-priority data flows may allow the processor to help ensure that more important data packets receive precedence and/or are transmitted with or before over less important packets. In some embodiments, the operations in block 804 may be based on packet filtering, using packet filters configured by the user, OEM or a self-learning module in the network apparatus.

In block 806, the at least one processor may assign a designated IP address range or a designated public port range for the high-priority data flows associated with a particular LAN interface. That is, to facilitate the quick identification and handling of higher priority data packets by the network devices, the processor may assign a specific IP address range or a public port range (e.g., 60000-61000) to the identified high-priority data flows. By allocating specific ranges for high-priority data, the processor may simplify packet filtering and routing operations, which may be particularly beneficial in environments with high data rates and low latency requirements.

In block 808, the at least one processor may receive an incoming uplink packet. The uplink packet may include data transmitted from a local device (e.g., a computer, smartphone, or any connected device) towards the network and/or may be destined for the internet or another network.

In block 810, the at least one processor may parse the received uplink packet to determine a source internet protocol (IP) address, a destination IP address, a protocol number, a source port number, a destination port number, an Ethernet source MAC address, an Ethernet destination MAC address, and/or other parameters in the packet headers. For example, the processor may examine the packet's Ethernet header to identify the source and destination MAC addresses, analyze the IP header to extract the source and destination IP addresses, and analyze the protocol number in the IP header to determine the protocol used (such as Transmission Control Protocol (TCP) or User Datagram Protocol (UDP)), how to further handle the packet's payload, etc. In some embodiments, the processor may also examine a transport layer header to extract the source and destination port numbers. The processor may use these and other extracted parameters to make informed decisions on packet routing, handling, and application-level processing.

The parsing in block 810 is important for efficiently implementing different filtering operations based on the direction of data flow. By analyzing the packet headers, the processor may effectively route packets to different DRBs and manage many data flows with different priority levels using fewer filters. This may in turn reduce latency and hardware costs.

In block 812, the at least one processor may determine whether the received packet matches one or more prioritized data flow packet filters. For example, the processor may compare the extracted parameters against a set of predefined criteria established for high-priority data flows. The predefined criteria may be determined based on various factors, such as specific source or destination IP addresses indicating critical network services, port numbers associated with priority applications such as voice over IP or streaming services, protocol types that could benefit from expedited processing, etc. The processor may identify a packet as being associated with a high-priority data flow in response to determining that the packet's characteristics align with the predefined criteria. By identifying high-priority packets, the processor may streamline prioritization and QoS enforcement processes in environments with multiple active data flows and diverse QoS requirements. In some embodiments, the identification of a packet as being associated with a high-priority data flow may trigger specific handling rules such as prioritized routing, reduced queuing delays, or specialized processing paths.

In block 814, the at least one processor may select a source port number or source public IP address from the previously reserved range dedicated for high-priority data flows in response to determining that the received packet matches one or more prioritized data flow packet filters. These selection operations may be an important part of the strategy to minimize the total number of packet filters used for segregating data based on priority. For example, the processor may reduce the total count of packet filters used for segregating data flows that meet the criteria of "priority=x" from other data flows. If block 814 were not present, i.e., dedicated port or IP address range is not reserved for "priority=x" data flows, each "priority=x" data flow could need one packet filter to segregate it from other data flows. However, if block 814 is present, i.e., dedicated port or IP address range is reserved for "priority=x" data flows, all "priority=x" data flows may be segregated from other flows using only one packet filter with a component "port range" or "IP address range", hence reducing the total count of packet filters used for segregating data flows that meet the criteria of "priority=x" from other data flows.

In block 816, the at least one processor may modify the received uplink packet by replacing the private source IP address with a public IP address of the network apparatus and replacing the private source port number with the selected high-priority source port number. For example, if the processor identifies an incoming packet as a high-priority data flow, such as real-time video or voice traffic, it may assign a source port from a designated range (e.g., 60000-61000, etc.) that has been reserved for such traffic. By using a dedicated port range for high-priority packets, the network device may efficiently identify and manage these packets (e.g., to apply appropriate routing rules, reduce latency, avoid congestion, etc.).

In some embodiments, the processor may modify the uplink packet so that it aligns with the above-described method of mapping data flows with the same priority level to a localized port range. The modifications in block 816 may aid in improving the efficiency of packet filtering and routing operations.

In block 818, the at least one processor may commence enqueuing the uplink packet into an uplink high-priority transmission queue. For example, in response to determining that a packet belongs to a high-priority data flow, the processor may add the packet to a specially designated queue that is reserved for urgent or time-sensitive data. In some embodiments, the high-priority queue may be configured for faster processing and transmission, which may reduce the latency experienced by high-priority applications and/or allow the network to provide a higher level of service quality for important data flows.

It should be understood that in some embodiments, the processor may be configured to perform any or all of the operations illustrated and described with reference to FIGS. 6B and 7 (e.g., implement an N-threshold strategy and/or set N buffer thresholds within a DRB, etc.) as part of the method 800.

In some embodiments, the processor may be configured to implement a dual-threshold strategy and/or set two different buffer thresholds (e.g., "Threshold1," "Threshold2") within a DRB. Threshold1 may be set equal to the total DRB buffer occupancy (or buffer size, etc.) minus a pre-defined buffer occupancy of X Bytes reserved for high-priority data. Threshold2 may be the definitive buffer threshold and be set equal to the total DRB buffer occupancy. When data in the DRB buffer reaches the first threshold (Threshold1), the network apparatus may cease to accommodate any new normal-priority data but continue to allow the arrival of new high-priority data. For example, if the first threshold is reached and the dedicated high-priority buffer occupancy X is 50 KB, then any new normal-priority data would be dropped but incoming high-priority data would still be accepted into the reserved 50 KB buffer space. The network apparatus may cease to admit any new incoming data, regardless of its priority level, in response to reaching the second threshold (Threshold2) in the DRB buffer.

In block 820, the at least one processor may forward the modified uplink packet to the next hop in the path towards the destination IP address in response to determining that the packet is enqueued successfully. Said another way, the processor may route the packet toward its destination in response to determining that a high-priority packet is securely placed in the appropriate queue. Forwarding the packet to the next hop in block 820 may reduce latency and improving network performance, and overcome significant technical challenges associated with multifunctional devices that serve as both WiFi routers and cellular modems. In some embodiments, the packet may undergo additional modifications (e.g., NAT) as it traverses the network, such as when the packet transitions from a private network to the internet.

Figure 9:
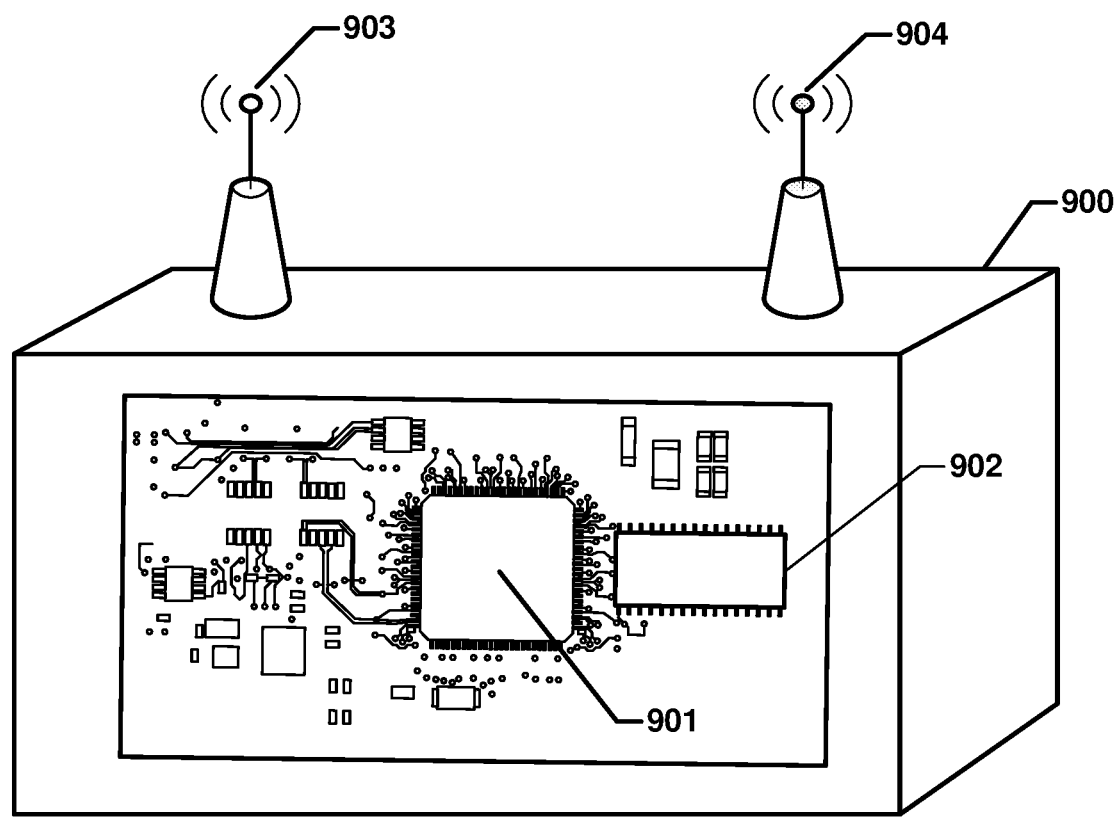
FIG. 9 is a component diagram of an example network apparatus suitable for implementing some embodiments.

Some embodiments may be implemented on any of a variety of commercially available network apparatuses, such as the network apparatus 800 illustrated in FIG. 9. Such a network apparatus 900 may include a processing system 901 including at least one processor coupled to volatile memory 902 (e.g., 312). The network apparatus 900 may include one or more transceivers for communicating with wired and/or wireless networks, such as a first wireless transceiver 903 for supporting a Wi-Fi wireless local area network and a second wireless transceiver 904 configured for supporting uplink and downlink communications with a cellular wireless wide area network, such as a 5G network. also include a floppy disc drive, USB, etc. coupled to the processing system 901.

The processors or processing systems discussed in this application may be or include any programmable microprocessor, microcomputer, or multiple processor chip or chips that can be configured by software instructions (applications) to perform a variety of functions, including the functions of various embodiments described. In some network apparatus configurations, multiple processors may be provided, such as one processor within first circuitry dedicated to wireless communication functions and one processor within a second circuitry dedicated to running other applications. Software applications may be stored in the memory before they are accessed and loaded into the processor. The processors may include internal memory sufficient to store the application software instructions.

Implementation examples are described in the following paragraphs. While some of the following implementation examples are described in terms of example methods, further example implementations may include: the example methods discussed in the following paragraphs implemented by a network apparatus including processing system coupled to memory and configured (e.g., with processor-executable instructions) to perform operations of the methods of the following implementation examples; the example methods discussed in the following paragraphs implemented by a network apparatus including means for performing functions of the methods of the following implementation examples; and the example methods discussed in the following paragraphs may be implemented as a non-transitory processor-readable storage medium having stored thereon processor-executable instructions configured to cause a processor of a network apparatus to perform the operations of the methods of the following implementation examples.

Example 1: A method of managing mixed data flow types in communications in a network apparatus supporting customer premise equipment (CPE) deployments and evolving automotive systems, including determining data flow priority levels of a plurality of data flows, identifying high-priority data flows in the plurality of data flows associated with a local area network (LAN) interface, and assigning a designated public internet protocol (IP) address range or a designated public port range for the identified high-priority data flows associated with the LAN interface.

Example 2: The method of example 1, further including receiving an incoming uplink packet, parsing the received uplink packet to determine one or more uplink packet parameters, the one or more uplink packet parameters including at least one or more of an uplink packet source IP address, an uplink packet destination IP address, an uplink packet protocol number, an uplink packet source port number, an uplink packet destination port number, an uplink packet Ethernet source MAC address, an uplink packet Ethernet destination MAC address, or other parameters in a packet header, determining whether the received uplink packet matches one or more prioritized data flow packet filters, and selecting a high-priority source port number from the designated public port range for the identified high-priority data flows associated with the LAN interface in response to determining that the received packet matches one or more of the prioritized data flow packet filters.

Example 3: The method of either of examples 1 or 2, further including generating a modified uplink packet that replaces a private source IP address of the received uplink packet with a public IP address of the network apparatus and replaces a private source port number of the received uplink packet with the selected high-priority source port number, commencing enqueuing the modified uplink packet into an uplink high-priority transmission queue, and forwarding the modified uplink packet to a next hop in a path towards the uplink packet destination IP address in response to determining that the modified uplink packet is enqueued successfully.

Example 4: The method of any of the examples 1-3, in which commencing enqueuing the modified uplink packet into the uplink high-priority transmission queue includes determining a priority level of the received uplink packet, determining a projected data radio bearer (DRB) buffer occupancy value that indicates a size of an uplink DRB buffer occupied by packets after adding the received uplink packet, determining whether the projected DRB buffer occupancy value exceeds a threshold value associated with the priority level of the received uplink packet, discarding the received uplink packet in response to determining that the projected DRB buffer occupancy value exceeds the threshold value associated with the priority level of the received uplink packet, and enqueuing the received uplink packet in response to determining that the projected DRB buffer occupancy value does not exceed the threshold value associated with the priority level of the received uplink packet.

Example 5: The method of any of the examples 1-4, further including receiving an incoming downlink packet that corresponds to the received uplink packet, parsing the received downlink packet to determine a downlink packet source IP address, a downlink packet destination IP address, a downlink packet source port number, or a downlink packet destination port number, and determining whether the downlink packet destination port number or destination IP address falls within the designated public port range or IP address range, respectively, for the identified high-priority data flows associated with the LAN interface by matching the received downlink packet against a packet filter including a component "destination port range" set to the designated public port range for the identified high-priority data flows associated with the LAN interface, or matching the received downlink packet against a packet filter including a component "destination IP address range" set to the designated IP address range for the identified high-priority data flows associated with the LAN interface.

Example 6: The method of any of the examples 1-5, further including determining an updated downlink packet destination IP address or an updated downlink packet destination port number for the received downlink packet based on a corresponding network address translation (NAT) mapping stored in memory, generating a modified downlink packet that include the updated downlink packet destination IP address or the updated downlink packet destination port number, commencing enqueuing the received downlink packet into a downlink high-priority transmission queue of a projected downlink interface of a next hop toward the downlink packet destination IP address, and forwarding the modified downlink packet to the next hop in a path towards the updated downlink packet destination IP address in response to determining that the received downlink packet is enqueued successfully.

Example 7: The method of any of the examples 1-6, in which the projected downlink next-hop interface is a WiFi interface, an Ethernet network interface controller (NIC) interface, a Bluetooth interface, or a universal serial bus (USB) interface.

Example 8: The method of any of the examples 1-6, in which commencing enqueuing the received downlink packet into the downlink high-priority transmission queue includes determining a priority level of the received downlink packet, determining a projected downlink next-hop interface buffer occupancy value that indicates a size of a downlink next-hop interface buffer occupied by packets after adding the received downlink packet, and determining whether the projected downlink next-hop interface buffer occupancy value exceeds a threshold value associated with the priority level of the received downlink packet.

Example 9: The method of example 6, in which commencing enqueuing the received downlink packet into the downlink high-priority transmission queue includes discarding the received downlink packet in response to determining that the projected downlink next-hop interface buffer occupancy value exceeds the threshold value associated with the priority level of the received downlink packet, and enqueuing the received downlink packet in response to determining that the projected downlink next-hop interface buffer occupancy value does not exceed the threshold value associated with the priority level of the received downlink packet.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote may process, function or procedure calls, electronic signals, data packets, memory read/writes, and other known network, computer, processor, and/or process related communication methodologies.

A number of different types of memories and memory technologies are available or contemplated in the future, any or all of which may be included and used in systems and computing devices that implement the various embodiments. Such memory technologies/types may include non-volatile random-access memories (NVRAM) such as Magnetoresistive RAM (M-RAM), resistive random access memory (ReRAM or RRAM), phase-change random-access memory (PC-RAM, PRAM or PCM), ferroelectric RAM (F-RAM), spin-transfer torque magnetoresistive random-access memory (STT-MRAM), and three-dimensional cross point (3D-XPOINT) memory. Such memory technologies/types may also include non-volatile or read-only memory (ROM) technologies, such as programmable read-only memory (PROM), field programmable read-only memory (FPROM), one-time programmable non-volatile memory (OTP NVM). Such memory technologies/types may further include volatile random-access memory (RAM) technologies, such as dynamic random-access memory (DRAM), double data rate (DDR) synchronous dynamic random-access memory (DDR SDRAM), static random-access memory (SRAM), and pseudo static random-access memory (PSRAM). Systems and computing devices that implement the various embodiments may also include or use electronic (solid-state) non-volatile computer storage mediums, such as FLASH memory. Each of the above-mentioned memory technologies include, for example, elements suitable for storing instructions, programs, control signals, and/or data for use in a computing device, system on chip (SOC) or other electronic component. Any references to terminology and/or technical details related to an individual type of memory, interface, standard or memory technology are for illustrative purposes only, and not intended to limit the scope of the claims to a particular memory system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods may be substituted for or combined with one or more operations of the methods.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application specific integrated circuit (TCUASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the at least one processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store target program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A network apparatus, comprising:
   a memory; and
   at least one processor coupled to the memory and configured to:
      determine data flow priority levels of a plurality of data flows;
      identify high-priority data flows in the plurality of data flows associated with a local area network (LAN) interface; and
      assign a designated public internet protocol (IP) address range or a designated public port range for the identified high-priority data flows associated with the LAN interface.

2. The network apparatus of claim 1, wherein the at least one processor is further configured to:
   receive an incoming uplink packet;
   parse the received uplink packet to determine one or more uplink packet parameters, the one or more uplink packet parameters including at least one or more of an uplink packet source IP address, an uplink packet destination IP address, an uplink packet protocol number, an uplink packet source port number, an uplink packet destination port number, an uplink packet Ethernet source media access control (MAC) address, an uplink packet Ethernet destination MAC address, or other parameters in a packet header;
   determine whether the received uplink packet matches one or more prioritized data flow packet filters; and
   select a high-priority source port number from the designated public port range for the identified high-priority data flows associated with the LAN interface in response to determining that the received packet matches one or more of the prioritized data flow packet filters.

3. The network apparatus of claim 2, wherein the at least one processor is further configured to:
   generate a modified uplink packet that replaces a private source IP address of the received uplink packet with a public IP address of the network apparatus and replaces a private source port number of the received uplink packet with the selected high-priority source port number;
   commence enqueuing the modified uplink packet into an uplink high-priority transmission queue; and
   forward the modified uplink packet to a next hop in a path towards the uplink packet destination IP address in response to determining that the modified uplink packet is enqueued successfully.

4. The network apparatus of claim 3, wherein the at least one processor is further configured to commence enqueuing the modified uplink packet into the uplink high-priority transmission queue by:
   determining a priority level of the received uplink packet;
   determining a projected data radio bearer (DRB) buffer occupancy value that indicates a size of an uplink DRB buffer occupied by packets after adding the received uplink packet;
   determining whether the projected DRB buffer occupancy value exceeds a threshold value associated with the priority level of the received uplink packet;
   discarding the received uplink packet in response to determining that the projected DRB buffer occupancy value exceeds the threshold value associated with the priority level of the received uplink packet; and
   enqueuing the received uplink packet in response to determining that the projected DRB buffer occupancy value does not exceed the threshold value associated with the priority level of the received uplink packet.

5. The network apparatus of claim 2, wherein the at least one processor is further configured to:
   receive an incoming downlink packet that corresponds to the received uplink packet;
   parse the received downlink packet to determine a downlink packet source IP address, a downlink packet destination IP address, a downlink packet source port number, or a downlink packet destination port number; and
   determine whether the downlink packet destination port number or destination IP address falls within the designated public port range or IP address range, respectively, for the identified high-priority data flows associated with the LAN interface by:
   matching the received downlink packet against a packet filter including a component "destination port range" set to the designated public port range for the identified high-priority data flows associated with the LAN interface; or
   matching the received downlink packet against a packet filter including a component "destination IP address range" set to the designated IP address range for the identified high-priority data flows associated with the LAN interface.

6. The network apparatus of claim 5, wherein the at least one processor is further configured to:

determine an updated downlink packet destination IP address or an updated downlink packet destination port number for the received downlink packet based on a corresponding network address translation (NAT) mapping stored in the memory;

generating a modified downlink packet that include the updated downlink packet destination IP address or the updated downlink packet destination port number;

commence enqueuing the received downlink packet into a downlink high-priority transmission queue of a projected downlink interface of a next hop toward the downlink packet destination IP address; and forwarding the modified downlink packet to the next hop in a path towards the updated downlink packet destination IP address in response to determining that the received downlink packet is enqueued successfully.

7. The network apparatus of claim 6, wherein the projected downlink next-hop interface is:
a WiFi interface;
an Ethernet network interface controller (NIC) interface;
a Bluetooth interface; or
a universal serial bus (USB) interface.

8. The network apparatus of claim 6, wherein the at least one processor is further configured to commence enqueuing the received downlink packet into the downlink high-priority transmission queue by:
determining a priority level of the received downlink packet;
determining a projected downlink next-hop interface buffer occupancy value that indicates a size of a downlink next-hop interface buffer occupied by packets after adding the received downlink packet; and
determining whether the projected downlink next-hop interface buffer occupancy value exceeds a threshold value associated with the priority level of the received downlink packet.

9. The network apparatus of claim 8, wherein the at least one processor is further configured to commence enqueuing the received downlink packet into the downlink high-priority transmission queue by:
discarding the received downlink packet in response to determining that the projected downlink next-hop interface buffer occupancy value exceeds the threshold value associated with the priority level of the received downlink packet; and
enqueuing the received downlink packet in response to determining that the projected downlink next-hop interface buffer occupancy value does not exceed the threshold value associated with the priority level of the received downlink packet.

10. A method of managing mixed data flow types in communications in a network apparatus supporting customer premise equipment (CPE) deployments and evolving automotive systems, comprising:
determining data flow priority levels of a plurality of data flows;
identifying high-priority data flows in the plurality of data flows associated with a local area network (LAN) interface; and
assigning a designated public internet protocol (IP) address range or a designated public port range for the identified high-priority data flows associated with the LAN interface.

11. The method of claim 10, further comprising:
receiving an incoming uplink packet;
parsing the received uplink packet to determine one or more uplink packet parameters, the one or more uplink packet parameters including at least one or more of an uplink packet source IP address, an uplink packet destination IP address, an uplink packet protocol number, an uplink packet source port number, an uplink packet destination port number, an uplink packet Ethernet source media access control (MAC) address, an uplink packet Ethernet destination MAC address, or other parameters in a packet header;
determining whether the received uplink packet matches one or more prioritized data flow packet filters; and
selecting a high-priority source port number from the designated public port range for the identified high-priority data flows associated with the LAN interface in response to determining that the received packet matches one or more of the prioritized data flow packet filters.

12. The method of claim 11, further comprising:
generating a modified uplink packet that replaces a private source IP address of the received uplink packet with a public IP address of the network apparatus and replaces a private source port number of the received uplink packet with the selected high-priority source port number;
commencing enqueuing the modified uplink packet into an uplink high-priority transmission queue; and
forwarding the modified uplink packet to a next hop in a path towards the uplink packet destination IP address in response to determining that the modified uplink packet is enqueued successfully.

13. The method of claim 12, wherein commencing enqueuing the modified uplink packet into the uplink high-priority transmission queue comprises:
determining a priority level of the received uplink packet;
determining a projected data radio bearer (DRB) buffer occupancy value that indicates a size of an uplink DRB buffer occupied by packets after adding the received uplink packet;
determining whether the projected DRB buffer occupancy value exceeds a threshold value associated with the priority level of the received uplink packet;
discarding the received uplink packet in response to determining that the projected DRB buffer occupancy value exceeds the threshold value associated with the priority level of the received uplink packet; and
enqueuing the received uplink packet in response to determining that the projected DRB buffer occupancy value does not exceed the threshold value associated with the priority level of the received uplink packet.

14. The method of claim 11, further comprising:
receiving an incoming downlink packet that corresponds to the received uplink packet;
parsing the received downlink packet to determine a downlink packet source IP address, a downlink packet destination IP address, a downlink packet source port number, or a downlink packet destination port number; and
determining whether the downlink packet destination port number or destination IP address falls within the designated public port range or IP address range, respectively, for the identified high-priority data flows associated with the LAN interface by:
matching the received downlink packet against a packet filter including a component "destination port range" set to the designated public port range for the identified high-priority data flows associated with the LAN interface; or matching the received downlink packet against a packet filter including a component "destination IP address range" set to the designated IP address range for the identified high-priority data flows associated with the LAN interface.

15. The method of claim 14, further comprising:
determining an updated downlink packet destination IP address or an updated downlink packet destination port number for the received downlink packet based on a corresponding network address translation (NAT) mapping stored in memory;
generating a modified downlink packet that include the updated downlink packet destination IP address or the updated downlink packet destination port number;
commencing enqueuing the received downlink packet into a downlink high-priority transmission queue of a projected downlink interface of a next hop toward the downlink packet destination IP address; and
forwarding the modified downlink packet to the next hop in a path towards the updated downlink packet destination IP address in response to determining that the received downlink packet is enqueued successfully.

16. The method of claim 15, wherein the projected downlink next-hop interface is:
a WiFi interface;
an Ethernet network interface controller (NIC) interface;
a Bluetooth interface; or
a universal serial bus (USB) interface.

17. The method of claim 15, wherein commencing enqueuing the received downlink packet into the downlink high-priority transmission queue comprises:
determining a priority level of the received downlink packet;
determining a projected downlink next-hop interface buffer occupancy value that indicates a size of a downlink next-hop interface buffer occupied by packets after adding the received downlink packet; and
determining whether the projected downlink next-hop interface buffer occupancy value exceeds a threshold value associated with the priority level of the received downlink packet.

18. The method of claim 17, wherein commencing enqueuing the received downlink packet into the downlink high-priority transmission queue comprises:
discarding the received downlink packet in response to determining that the projected downlink next-hop interface buffer occupancy value exceeds the threshold value associated with the priority level of the received downlink packet; and
enqueuing the received downlink packet in response to determining that the projected downlink next-hop interface buffer occupancy value does not exceed the threshold value associated with the priority level of the received downlink packet.

19. A network apparatus, comprising:
means for determining data flow priority levels of a plurality of data flows;
means for identifying high-priority data flows in the plurality of data flows associated with a local area network (LAN) interface; and
means for assigning a designated public internet protocol (IP) address range or a designated public port range for the identified high-priority data flows associated with the LAN interface.

20. The network apparatus of claim 19, further comprising:
means for receiving an incoming uplink packet;
means for parsing the received uplink packet to determine one or more uplink packet parameters, the one or more uplink packet parameters including at least one or more of an uplink packet source IP address, an uplink packet destination IP address, an uplink packet protocol number, an uplink packet source port number, an uplink packet destination port number, an uplink packet Ethernet source media access control (MAC) address, an uplink packet Ethernet destination MAC address, or other parameters in a packet header;
means for determining whether the received uplink packet matches one or more prioritized data flow packet filters; and
means for selecting a high-priority source port number from the designated public port range for the identified high-priority data flows associated with the LAN interface in response to determining that the received packet matches one or more of the prioritized data flow packet filters.

* * * * *